US006669051B1

(12) United States Patent
Phallen et al.

(10) Patent No.: US 6,669,051 B1
(45) Date of Patent: Dec. 30, 2003

(54) HIGH SPEED BEVERAGE DISPENSING METHOD AND APPARATUS

(75) Inventors: Iver J. Phallen, Youngstown, NY (US); Douglas N. Vogt, Pavillion, NY (US); Robert Comfort, West Seneca, NY (US); Richard J. Jezuit, Jr., Lancaster, NY (US); David C. Messing, North Tonawanda, NY (US); Scott McIlhagga, Lancaster, NY (US); David J. Carroll, Tonawanda, NY (US)

(73) Assignee: Niagara Pump Corporation, Tonawanda, NY (US)

( * ) Notice: Subject to any disclaimer, the term of this patent is extended or adjusted under 35 U.S.C. 154(b) by 0 days.

(21) Appl. No.: 10/129,771

(22) PCT Filed: Nov. 9, 2000

(86) PCT No.: PCT/US00/30966

§ 371 (c)(1), (2), (4) Date: Aug. 19, 2002

(87) PCT Pub. No.: WO01/35060

PCT Pub. Date: May 17, 2001

Related U.S. Application Data

(60) Provisional application No. 60/164,671, filed on Nov. 9, 1999.

(51) Int. Cl.[7] ................................................ G01F 11/00
(52) U.S. Cl. ......................... 222/1; 222/394; 222/400.7
(58) Field of Search ............................. 222/1, 61, 394, 222/400.7, 400.8

(56) References Cited

U.S. PATENT DOCUMENTS

| | | | |
|---|---|---|---|
| 2,450,315 | A | 9/1948 | Vetrano |
| 3,881,636 | A | 5/1975 | D'Aubreby |
| 4,517,651 | A | 5/1985 | Kawasaki et al. |
| 4,648,421 | A | 3/1987 | Chant et al. |
| 4,750,646 | A | 6/1988 | Gerich |
| 4,850,387 | A | 7/1989 | Bassill |
| 4,886,190 | A | 12/1989 | Kirschner et al. |
| 5,299,715 | A | 4/1994 | Feldman |
| 5,603,363 | A | 2/1997 | Nelson |

FOREIGN PATENT DOCUMENTS

| | | |
|---|---|---|
| DE | 35 15 762.7 U1 | 9/1985 |
| EP | 0 111 629 A2 | 6/1984 |
| EP | 0 861 801 A1 | 9/1998 |
| GB | 2 283 299 A | 10/1993 |

*Primary Examiner*—Joseph A. Kaufman
(74) *Attorney, Agent, or Firm*—John L. Thompson

(57) ABSTRACT

Method and apparatus for the high speed dispensing of all beverages, and particularly carbonated beverages. The major elements of the device include a main flow control valve (3) coupled to a pressurized container (1) such as a beer keg, a positive shut-off filling nozzle (10), a pressure control valve (7) associated with the filling nozzle, and requisite control electronics and actuators to establish a dispenser operating sequence. A defined dose of beverage is dispensed by first closing the main flow valve, then briefly opening the pressure control valve, thereby lowering the hydraulic pressure in the nozzle to a desired pressure lower than that applied to the beverage container, then gently opening the beverage filling nozzle and immediately thereafter opening the main flow valve, maintaining the main flow valve in an open condition for a time required to produce a defined dose of beverage, and then rapidly closing the beverage filling nozzle while maintaining the main flow control valve in an open condition.

7 Claims, 28 Drawing Sheets

HIGH SPEED BEVERAGE DISPENSING METHOD AND APPARATUS

CROSS-REFERENCE TO RELATED APPLICATIONS

This application is a national stage filing under 35 U.S.C. 371 of PCT application No. PCT/US00/30966 filed Nov. 9, 2000. In addition, applicant claims the benefit under 35 U.S.C. §119(e) of U.S. provisional patent application ser. No. 60/164,671 filed Nov. 9, 1999.

TECHNICAL FIELD

The present invention relates generally to a unique and novel method and apparatus for the high speed dispensing of all beverages, and particularly carbonated beverages. More particularly, the major elements of the apparatus include tubing connected at one end to a beverage supply in the form of a pressurized container such as a beer keg (or pumped flow source of liquid beverage) and at the other end to a positive bottom shut-off filling nozzle, a main flow control valve coupled to the tubing, a pressure control valve downstream of the main flow control valve and associated with the filling nozzle via a nozzle pressure control port fluid line, and requisite electronic controller and actuators to establish a dispenser operating sequence. In addition, a heat exchanger may be disposed upstream of the positive bottom shut-off filling nozzle.

BACKGROUND OF THE INVENTION

The dispensing of beer for public and consumption is a ubiquitous activity. The dispensing of other carbonated and still beverages is equally widespread. In the particular case of draft beers and carbonated beverages in general, numerous problems and limitations associated with known dispensing systems are well documented.

A first limitation of known types is the control of foaming within the fluid flow pathway as a result of the rate of flow and associated pressure changes within a carbonated beverage or beer dispensing apparatus. It is well understood that the flow rate and pressure directly correlate and that drops in pressure beyond a defined magnitude or rate cause dissolved gases (typically carbon dioxide) in a sparkling beverage to leave solution and enter gas phase. This physical phenomenon is variously referred to in the beverage domain as foaming, blooming, breakout, out gassing, or foam out.

A second limitation of known systems is the control of foaming as a result of the physical interaction of the beer or carbonated beverage with the vessel into which it is dispensed. For example, it is well understood that the degree of foaming that occurs during the pouring of a draft beer increases with increasing flow rates into the cup, glass, or pitcher, or any other vessel. The excessive foaming that may occur as a draft beer is flowed into a drinking vessel is increased as a function of the turbulence and trauma directly associated with flow rate and foam formation is further increased by the entrainment of air into the beer as a function of such flow induced agitation. This foam event associated with high flow rates into the serving vessel is variously referred to as foaming, frothing or fobbing. In all cases of foam associated dispensing problems, the general concept that foam makes more foam is valid for understanding such fluids behavior.

The consequences of excessive foaming of carbonated beverages and draft beer from all causes in known systems are so severe as to limit and slow dispense flow rates. This, in turn, results in protracted and lengthened dispense times. This problem is particularly pervasive and notable in the case of draft beer, where lagers, ales, stouts and all other styles exhibit excessive foaming problems on a frequent basis, and are filled slowly into vessels as a matter of preferred practice. The inability of beverage dispense designs of known type to dispense carbonated drinks and draft beers at high speeds carries substantial penalties. It results in an inefficient serving environment where prompt service is demanded or desired. It slows the rate at which beverages can be served, impairing cash flow and return on installed equipment and facility investment. It compromises drink quality by forcing the pre-service dispensing of draft beers to meet peak demand in venues of high periodic demand such as sports arenas and stadiums.

It is also important to note that dispensing systems of know design and in common usage cannot dispense on a dose or portion controlled basis because of the excessive and variable foam problem. Thus, the economic and quality benefits of portion controlled dosing are not available to the consumer or the vendor. This forces costs up for the consumer and profits down for the vendor.

In one recent study of draft beer dispensing at a National Football League stadium (US) it was observed that the absolute dispense time or absolute dose time, the time from start of beer flow to end of beer flow, into a 20 ounce plastic serving cup varied from 15 to 20 seconds. This provides some perspective on the limitations faced in providing the thousands of draft beer servings which may be demanded in the space of a 15 to 30 minute sports intermission period. Clearly, dispenser devices of known type present severe limitations in design and practice to the high speed dispensing of beverages.

Numerous designs have been set forth in the prior art for the specific purpose of improving the speed and dispensing characteristics of draft beer and other carbonated beverages. Vetrano (U.S. Pat. No. 2,450,315) teaches a beer faucet with a tubular portion with a bottom plug having a conical valve seat, an operating rod with guide spiders within the tubular portion and a ball valve shut-off fitted to the rod thus providing a bottom shut-off filling nozzle. Filling with the nozzle at the bottom of the glass is shown and a first gentle and second fast flow rate are provided for, but operation is manual and speed of fill, amount of foam and amount of pour are dependent upon the technique and skill of the bartender. Vetrano is silent regarding any other aspects, methods or apparatus associated with the dispensing apparatus.

In UK Patent Application GB 2,283,299 A, Rawling discloses three embodiments of a beverage dispenser valve system. Each embodiment provides for manual dispensing without portion control. Each device does provide for variable flow rate control based on a variable flow area arrangement. Also provided is a gas trap designed to collect gas bubbles at the point of dispense and manually introduce them as desired into the beverage being served in order to cause the formation or addition of a foam head or fob. In one version a sealed dome is fitted at the filling tap for the purpose of trapping or accumulating gas bubbles emerging from the beverage, thus to reduce frothing or foaming of the beverage. The dome is transparent and thus the bartender can determine when it is full and manually purge it through the filling tap as desired. Rawling does not disclose any bottom or subsurface filling structure or method.

In European Patent Application EP 0,861,801 A1, James discloses a bottom shut-off filling nozzle-valve for the manual dispensing of beverages. The device is particularly intended to reduce the time taken to dispense a carbonated beverage such as a lager. The device consists of a long spout with a bottom sealing valve element, designed to be placed at the bottom of the vessel into which the beverage is dispensed and to remain below the level of the beverage as it is dispensed. The spout has an external centering structure at its tip to keep the valve generally coaxial with the spout. James teaches a higher flow rate of dispense without excessive foam formation by reducing the velocity of flow into the vessel with vertical flow in the nozzle being gradually altered to horizontal flow into the cup, the reduced velocity causing less agitation and thus less liberation of gas. James does not disclose variable flow rate capability and the filling valve sees the pressure applied to or by the beverage at all times.

Nelson (U.S. Pat. No. 5,603,363) teaches a carbonated beverage dispenser designed for rapid dispensing on a defined dose basis consisting of an elevated and liquid level controlled tank holding beverage at atmospheric pressure such that timed flow from the tank into a vessel defines a dose. Flow from the tank is through a long nozzle with a rod operated conical bottom shut-off designed for bottom-up subsurface filling of a vessel. The tank is chilled to maintain the beverage at a desired temperature. The nozzle actuator is controlled electronically to define a desired dose size. The system is equipped with a clean-in-place sanitizing apparatus.

Nelson does not teach method or apparatus to alter dispensing flow rate, the nature of reservoir replenishment valve, nature of the control computer, ability to prevent loss of carbonation or sparkle in the beverage held at atmospheric pressure for extended periods, means to alter or define or calibrate the desired amount of foam associated with a particular beverage, actuation speeds or motion characteristics of the filling nozzle, or means and method to assure that the reservoir beverage supply flow rate equals or exceeds the takeaway rate as a means of assuring continuous dispenser operating capability without depletion of available beverage in the reservoir.

OBJECTS AND SUMMARY OF THE INVENTION

It is a primary object of the present invention to overcome the numerous disadvantages and limitations, as set forth above, of presently known beverage dispense methods and devices.

More particularly, the primary objects of the present invention include:

1. To disclose a unique and novel beverage dispenser apparatus where the fluid flow pathway is hydraulic and at an essentially uniform rack pressure when dispensing is not occurring, the rack pressure being the pressure applied to the beverage supply.
2. To disclose a unique and novel beverage dispensing method where the pressure in the dispensing nozzle is actively lowered, under electronic control, from an essentially uniform rack pressure to a pressure at or near atmospheric pressure just prior to the start of a dispensing cycle.
3. To disclose a unique and novel method and apparatus for priming or packing the disclosed beverage dispensing system, such that a hydraulic condition is established quickly and efficiently with a minimal loss of beverage and minimal generation of foam.
4. To disclose a unique and novel method and apparatus, termed a watchdog timer, for eliminating foam or gas in the fluid flow pathway of the dispenser as it accumulates or generates over an electronically definable period of dispenser inactivity.
5. To disclose unique and novel methods and apparatus for establishing a defined amount of foam in the dispenser fluid flow pathway just prior to a dispense cycle such that a specified and desired amount of foam can be repeatably and automatically created in a successive series of dispensed drinks.
6. To disclose a unique and novel valve arrangement and valve control sequence which eliminates the problems of excessive foaming associated with high speed dispensing of carbonated and sparkling beverages of all types in a hydraulic beverage dispense system.
7. To disclose unique and novel filling nozzles which eliminate large areas or pockets for gas or foam to become trapped.
8. To disclose unique and novel filling nozzles which provide means to remove small quantities of trapped foam or gas on an active control basis.
9. To disclose a beverage dispenser method and apparatus wherein the speed and motion control and motion characteristics of the filling nozzles are controllable and manipulated and can be empirically demonstrated to alter and influence and control the dosing characteristics of the system particularly with regard to amount of foaming and dosing set point stability and repeatability.
10. To disclose beverage filling nozzles which are unique and novel with respect to means and methods to reduce internal nozzle volume while preserving low velocity, high speed dispensing capabilities.
11. To disclose a unique and novel dispensing method and apparatus capable of filling a 20 ounce plastic drink cup with a wide variety of draft beers in an absolute dose time, as defined above, in 2.5 seconds or less, with an electronically definable and controllable amount of foam.
12. To disclose the unique and novel use of precise fast-acting pinch valves for control of flows and pressures within the preferred embodiments of the beverage dispensing system.
13. To disclose a unique and novel beverage dispenser apparatus where the flow rate or pressure of a beverage moving hydraulically through the fluid flow pathway can be widely and dynamically varied by electronic control of a true digital pressure control apparatus defining motive force pressure at the beverage keg or any other beverage supply source container.
14. To disclose a unique and novel beverage dispenser apparatus where the flow rate or pressure of a beverage moving hydraulically through the fluid flow pathway can be widely and dynamically varied through the use and electronic control of a novel long axis non-invasive progressively restrictive flow control apparatus, the several embodiments of the flow control apparatus being the subject of a separate patent specification.
15. To disclose a unique and novel beverage dispenser apparatus where the flow rate or pressure of a beverage moving hydraulically through the fluid flow pathway can be widely and dynamically varied through the use and electronic control of a positive rotary displacement pump.
16. To disclose a unique and novel beverage dispensing apparatus where the reduced pressure in the fluid flow pathway during dispensing is rapidly restored to rack pressure at the end of a dispensing cycle through the use of an electronically controlled valve sequence.
17. To disclose a unique and novel beverage dispensing apparatus where a carbonated beverage can be held for long periods of time within the fluid flow pathway without change in character or deterioration in quality, by virtue of being held at rack pressure.

18. To disclose a unique and novel beverage dispensing system where the worst case delay between successive dispensing cycles is one second or less, and where the apparatus can execute dispense cycles indefinitely with this minimal delay period, dependent only upon the availability of a bulk supply of beverage to the systems.

19. To disclose a unique and novel beverage dispensing system in which the optimal operating parameters for a particular specific beverage, including flow rate, operating pressure, pressure control intervals and sequences, dose time, dispensing temperature, filling nozzle motions and speeds, priming flow time, and flow profiling data during dispensing can be grouped as a machine setup or recipe and entered into the machine electronic controller on a non-volatile basis such that it may be recalled in a display at any time among many other recipes and utilized to electronically configure the machine for operation as desired.

20. To disclose a unique and novel dispensing system wherein the filling nozzle can be automatically lowered into a vessel prior to a dispense cycle and held near the bottom of the cup for a defined period during the dispense cycle, and raised out of the vessel at a desired rate, all nozzle articulations being under electronic control via the dispenser controller.

21. To disclose a unique and novel dispensing method and apparatus wherein the flow rate of the beverage during the dispensing cycle can be electronically profiled to compress or reduce the dose time to a minimum interval while allowing dispensing of foamy or carbonated beverages with a minimal but programmable amount of foam to meet a desired presentation criteria.

22. To disclose a unique and novel beverage dispensing apparatus wherein a defined portion or dose is established by electronic control of flow time at a defined pressure or pressures, and in which it can be empirically demonstrated that dose set point stability and repeatability is dependent upon the unique ability of the invention to manipulate and control pressures and flows in a repeatable manner and sequence with each successive dose cycle.

23. To disclose a unique and novel beverage dispensing apparatus in which the beverage pressure in the filling nozzle may be reduced below rack pressure just prior to the filling cycle by increasing the fluid flow pathway or lumen volume through the opening or decompression of a partially compressed but not occluded flexible tube installed in the nozzle pressure control port fluid line.

24. To disclose a unique and novel beverage dispensing apparatus in which the flow and pressure control pinch valves can be shown to be particularly suitable for the flow and pressure control of carbonated beverage, and especially beer, because the pressure drop across the valve devices is very low due to the characteristic full opening flow pathway through the valves, and because of the fast opening and closing action of the valve devices, both properties serving to allow on-off valving action without inducing foaming of the beer.

25. To disclose a unique and novel beverage dispensing apparatus in which the flow and pressure control pinch valves preferably utilized provide inherently non-invasive and sanitary operation within the dispenser fluid flow pathway, the valves providing straight through and seamless construction, free of crevices or pockets.

26. To disclose a unique and novel beverage dispenser in which the priming or packing sequence upon system start-up or beverage source changeover can be electronically controlled and automatic in nature such that a minimal quantity of beverage is lost to the start-up process, and in which the priming process is carried out in an efficient and minimal amount of time, and in which a distinct and unique set of priming parameters can be defined for each unique beverage type and electronically stored in association with the electronically defined dispensing parameters for the particular beverage.

27. To disclose a unique and novel beverage dispenser in which the full open position of the filling nozzle is sensed or encoded such that a closed loop control condition is established, thus insuring that beverage flow into a vessel cannot occur until a correct open nozzle condition is assured; nozzle open encoding providing a guarantee of minimal delay for beverage flow to be initiated thus minimizing dispensing time and eliminating gravity mediated beverage fallout from the nozzle and consequent air entry into the nozzle thus further minimizing beverage foaming; nozzle open encoding providing a safety assurance that high speed flow of beverage cannot ensue from a partially open nozzle, thus protecting the dispenser operator; nozzle open encoding providing an empirically demonstrable improvement in filling dose set point accuracy and stability.

28. To disclose a unique and novel beverage dispenser in which the fluid flow pathway has been particularly designed to minimize foaming, by means including the elimination of threaded fittings and connectors, the use of large diameter flow tubes and conduits, the use of smooth and gradual transitions in fluid flow pathway sizes, the use of smooth bore sanitary fittings and connectors, and the elimination of sharp bend elbows in favor of large radius sweep ells.

29. To disclose a unique and novel beverage dispenser in which the exterior surfaces of the nozzle fill tube are maintained in a clean and sanitary condition for extended operating periods by the provision for and use of one or more ozone generators positioned adjacent to but apart from the nozzle such that the nozzle fill tube is periodically or continuously exposed to a low concentration of ozone gas, thus greatly reducing the rate of bacterial growth on the nozzle shank or tube.

30. To disclose a unique and novel beverage dispenser in which the electronic control design allows extensive alarm diagnostic and supervisory functions including alarms such as nozzle fail to open, low or no beverage condition, low gas pressure, high gas pressure, pressure control valve fail to cycle, main flow control valve fail to operate, improper product temperature, low mains voltage, and low battery voltage in portable systems; including annunciation of maintenance intervals, sanitation intervals, inspection intervals, inventory control data and functional status.

31. To disclose a unique and novel beverage dispenser in which the electronic controller contains one or more clean-in-place (CIP) routines or sequences for automatic sanitizing of the system fluid flow pathway.

32. To disclose a unique and novel beverage dispenser in which the electronic controller can optionally be linked in a network array such that the device can be addressed from a remote mode for data retrieval; so that the machine can be remotely setup on a selected beverage; so that the machine can provide status polling; and so that the machine can be accessed for remote diagnosis of fault conditions.

33. To disclose a unique and novel beverage dispenser in which the small quantity of foam or liquid beverage removed from the fluid flow pathway by the brief opening of the pressure control valve prior to each dispense cycle is connected into the hollow operator rod connecting to the nozzle plug and through the plug and thus into the vessel receiving the beverage dose.

34. To disclose a unique and novel beverage dispenser in which the nozzle plug associated with the positive bottom shut-off filling nozzle can open inward to allow liquid flow as well as outward.

35. To disclose a unique and novel beverage dispenser in which filling nozzles of different lengths and diameters can readily and interchangeably be fitted to the system, thus enhancing the flexibility and versatility of the invention with a broad range of beverage vessel shapes and sizes.

36. To disclose a unique and novel beverage dispenser in which a start fill delay time may be entered into the dispensing sequence after the filling nozzle has been read as open by the nozzle open sensor; the start fill delay allowing further control over the amount of foam created in the vessel being filled.

37. To disclose a unique and novel beverage dispensing apparatus in which the amount of beverage flow required to prime or pack the fluid flow pathway can be electronically defined.

38. To disclose a unique and novel beverage dispensing apparatus in which the dispensing or flow time required to define and to maintain a desired beverage dose or dispensed volume can be automatically and electronically varied as a function of varying beverage supply pressure.

The foregoing objects and advantages of this invention will become apparent after a consideration of the following detailed description taken on conjunction with the accompanying drawings in which differing forms of this invention are illustrated.

BRIEF DESCRIPTION OF THE DRAWINGS

FIG. 24 showing the disposition of the parts when the nozzle assembly is closed, and FIG. 25 showing the disposition of the parts when the nozzle assembly is open.

DETAILED DESCRIPTION

Figure 1:
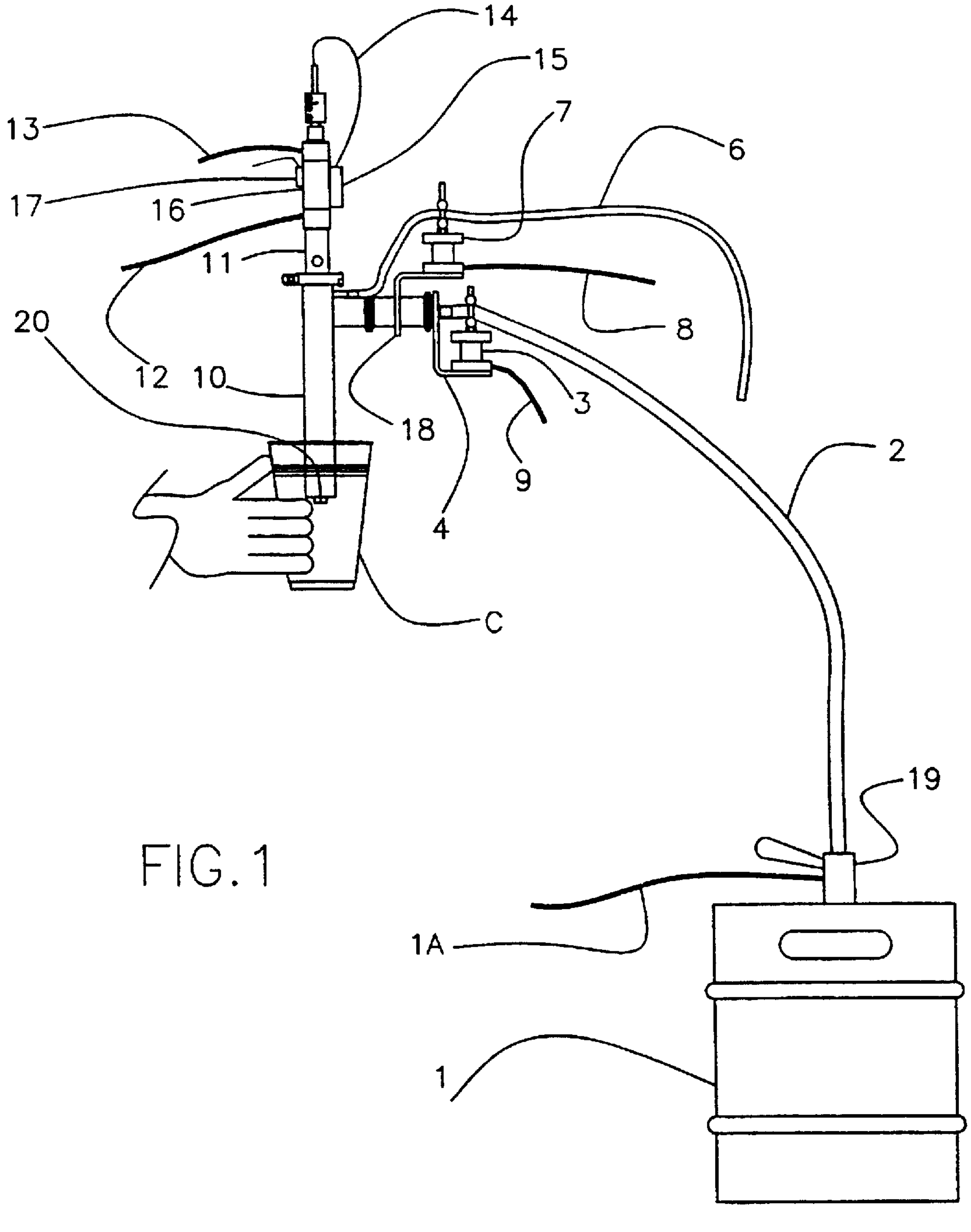
FIG. 1 is an illustration of a first embodiment of the invention, showing the system without a heat exchanger.

The high speed dispensing of beverages, especially carbonated and sparkling beverages and especially of beer, is fraught with problems and difficulties. Of particular note are the problems of controlling foaming at high flow rates and of maintaining beverage quality and character in a high speed dispensing system.

The present invention is uniquely capable of high speed dispensing of carbonated beverages, especially beer. The notion of high dispensing speed has two components, the absolute dispense time and the machine cycle time. Absolute dispense time is defined as the elapsed time from the start of a dispense cycle to the end of a dispense cycle. The machine cycle time is defined as the minimum possible time the machine functions can accommodate between dispense cycles.

In the case of the present invention, as one benchmark of high speed, the dispenser is uniquely capable of producing a 20 ounce (600 mL) dose of beer in an absolute dose time of 2.5 seconds or less, and typically well less than 2.0 seconds. The actual duration of beer flow into the cup is typically about 1.5 seconds. These absolute dispense times are characterized by a defined and controlled amount of foam associated with the pour.

The dispenser of the present invention also manifests a very fast cycle time. Typically, the system is capable of resuming a dispense cycle in no more than 0.25 seconds and, in the worst case, in 1 second. This is an important and novel feature in that in practical terms the cycle time is constrained in the design herein disclosed only by the human element of operation, which requires the placement and removal of drink cups under the filling nozzle. It is also important to understand that the minimal cycle time of the dispenser design herein presented is a direct consequence of its hydraulic design where there is no intermediate reservoir requiring beverage supply or re-supply maintenance and thus beverage is always available in real time for dispense into the serving cup.

Overall, the beverage dispenser machine detailed here is capable of producing one complete 20 ounce serving cycle as fast as every 2.25 seconds. At this speed, the machine is unconstrained in speed of function by any beverage flow limitations through the fluid flow pathway of the machine save for the availability of beverage to the machine from a bulk supply source.

By comparison, the beverage dispenser of the present invention can dispense over twenty-six beer pours per minute of 20 ounces each, while conventional beer dispensers can typically dispense three to four pours per minute of the same serving size. Thus, the high speed beverage dispenser herein detailed and disclosed offers a speed increase of over six times compared to known conventional designs.

The present invention consists of a solution to the high speed dispensing problem in which beverage quality and character are maintained through the use of a pressurized hydraulic system. By hydraulic, it is meant that the fluid flow pathway of the dispenser is completely filled with the beverage to be dispensed. The foaming problem associated with high speed dispensing is solved by active electronic control, manipulation and sequencing of beverage flows and pressures within the system and careful control of beverage flow out of the filling nozzle and into a receiving vessel such as a cup C.

The present invention consists of numerous preferred embodiments including:

1. A basic dispenser version consisting of a fluid line connecting a source of beverage to a main flow control valve, a fluid line connecting the main flow control valve to a positive bottom shut-off filling nozzle, a pressure control valve controlling flow through a flow pathway generally connected to the upper portion of the filling nozzle, actuators for manipulating the three valve elements, a trigger or start sensor associated with the nozzle tip for initiating dispensing, and an electronic controller providing control of the apparatus.
2. A second version of the dispenser apparatus in which a heat exchanger is coupled to the filling nozzle for the purpose of controlling and maintaining the temperature of the beverage being dispensed. The heat exchanger may be close coupled to the filling nozzle in which case the main flow control valve is interposed between the beverage supply and the heat exchanger, or alternatively the heat exchanger may be more remotely located from the filling nozzle such that the main flow control valve is interposed between the heat exchanger and the filling nozzle.
3. A third version of the dispenser apparatus in which a suitable flow rate control device, typically a long axis non-invasive progressively restrictive flow control or a progressively less restrictive flow control is inserted into the fluid flow pathway between the beverage source and the filling nozzle, the flow control device being locatable variously relative to the beat exchanger and the main flow control valve.
4. A fourth version of the dispenser apparatus wherein flow rate control of the beverage through the fluid flow pathway of the apparatus is substantially defined by a digital pressure control device, the device being electronically controlled and the desired flow rate determining pressure being applied to the beverage source and defined and established by the dispenser electronic controller.
5. A fifth version of the dispenser apparatus wherein flow rate control of the beverage through the fluid flow pathway of the apparatus is substantially defined by the use of a rotary positive displacement pump or linear peristaltic pump interposed between the beverage supply source and the main flow control valve; the pump type being widely variable and the pump being especially useful in establishing adequate flow rates for high speed dispensing of beverages where the beverage dispenser apparatus is substantially separated from the beverage source.

In operation, the various components of the first or second preferred embodiments operate together to provide high speed beverage dispensing.

Figure 8:
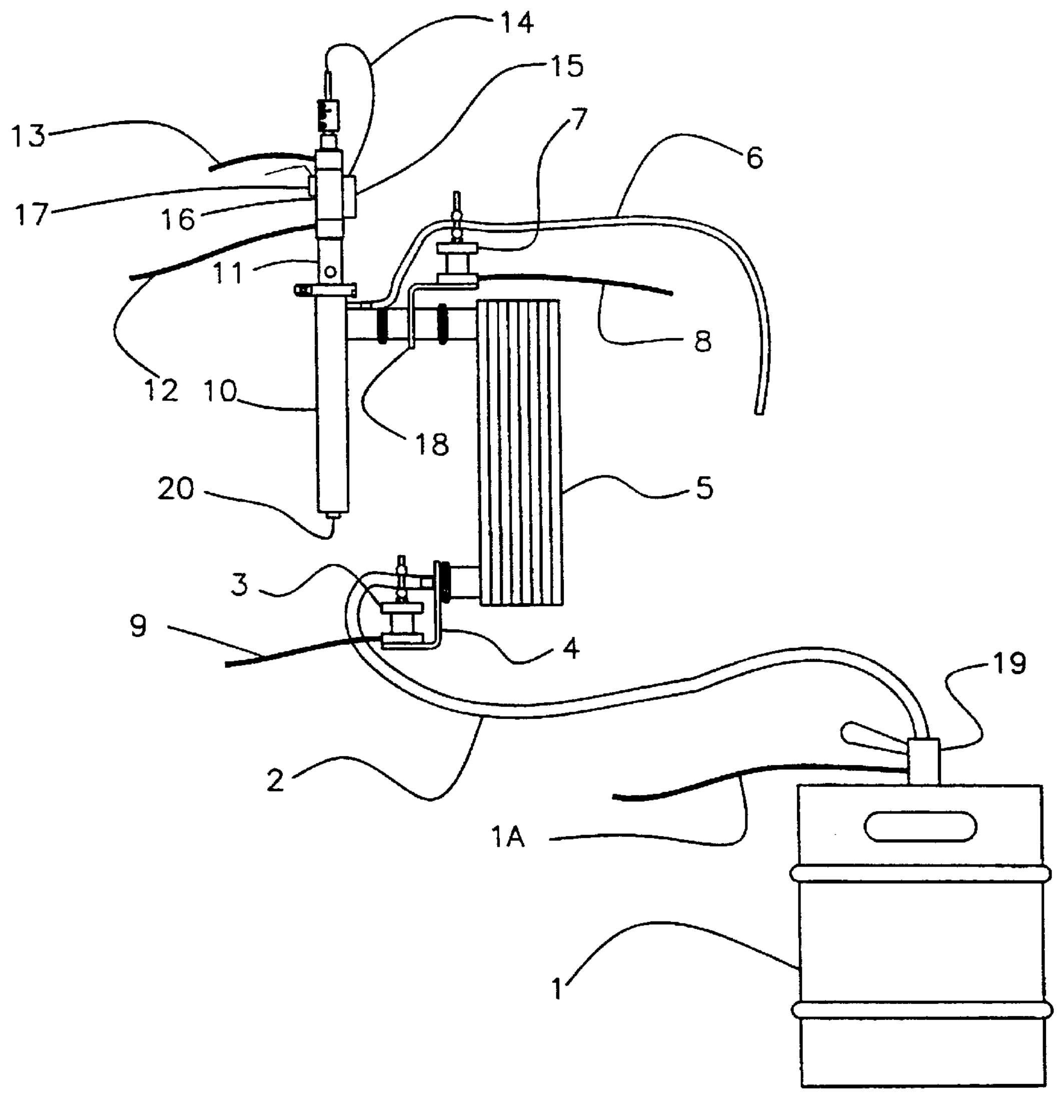
FIG. 8 is a view similar to FIG. 1 but shows another preferred embodiment of this invention wherein a heat exchanger is disposed between the bulk supply source container of the beverage to be dispensed, for example a beer keg, and the filling nozzle assembly.
Figure 8A:
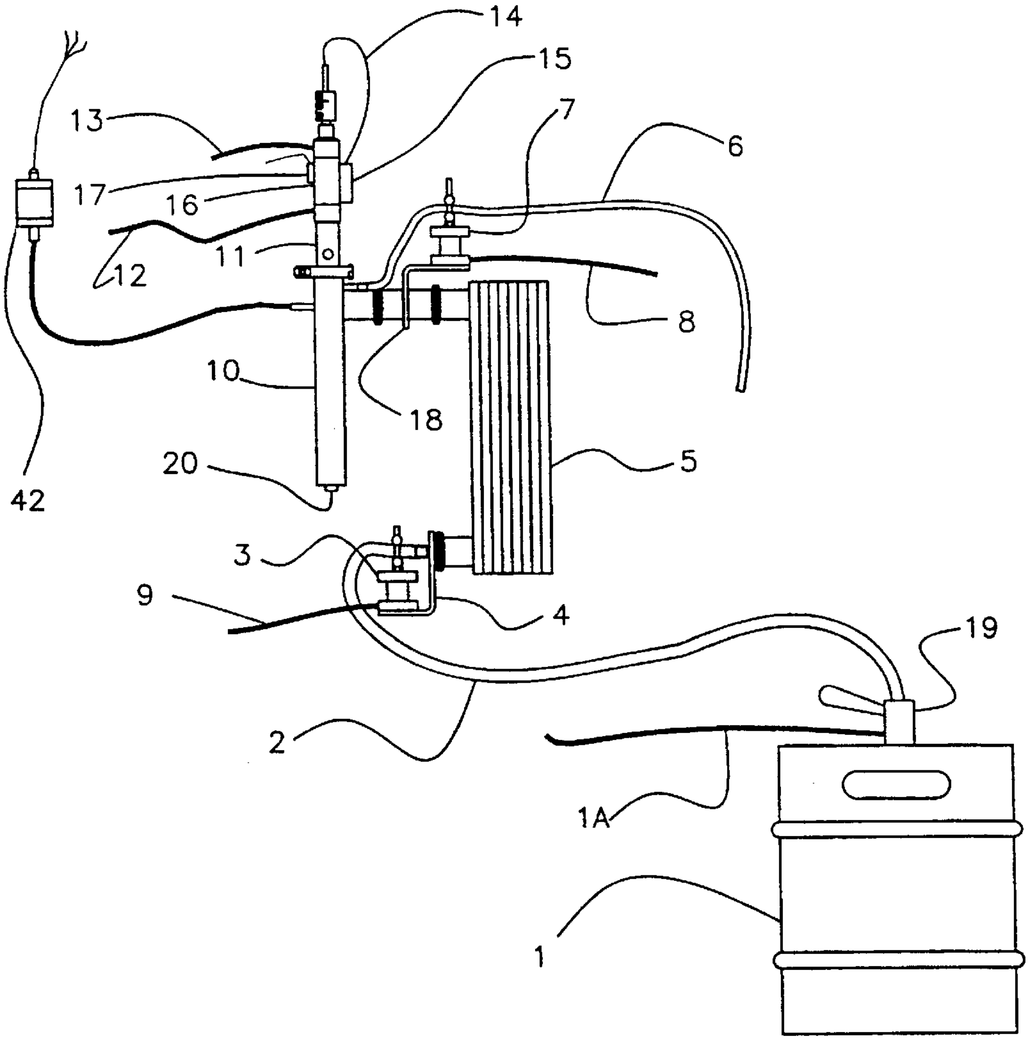
FIG. 8A is a view similar to FIG. 8 but additionally showing a pressure sensor.
Figure 9:
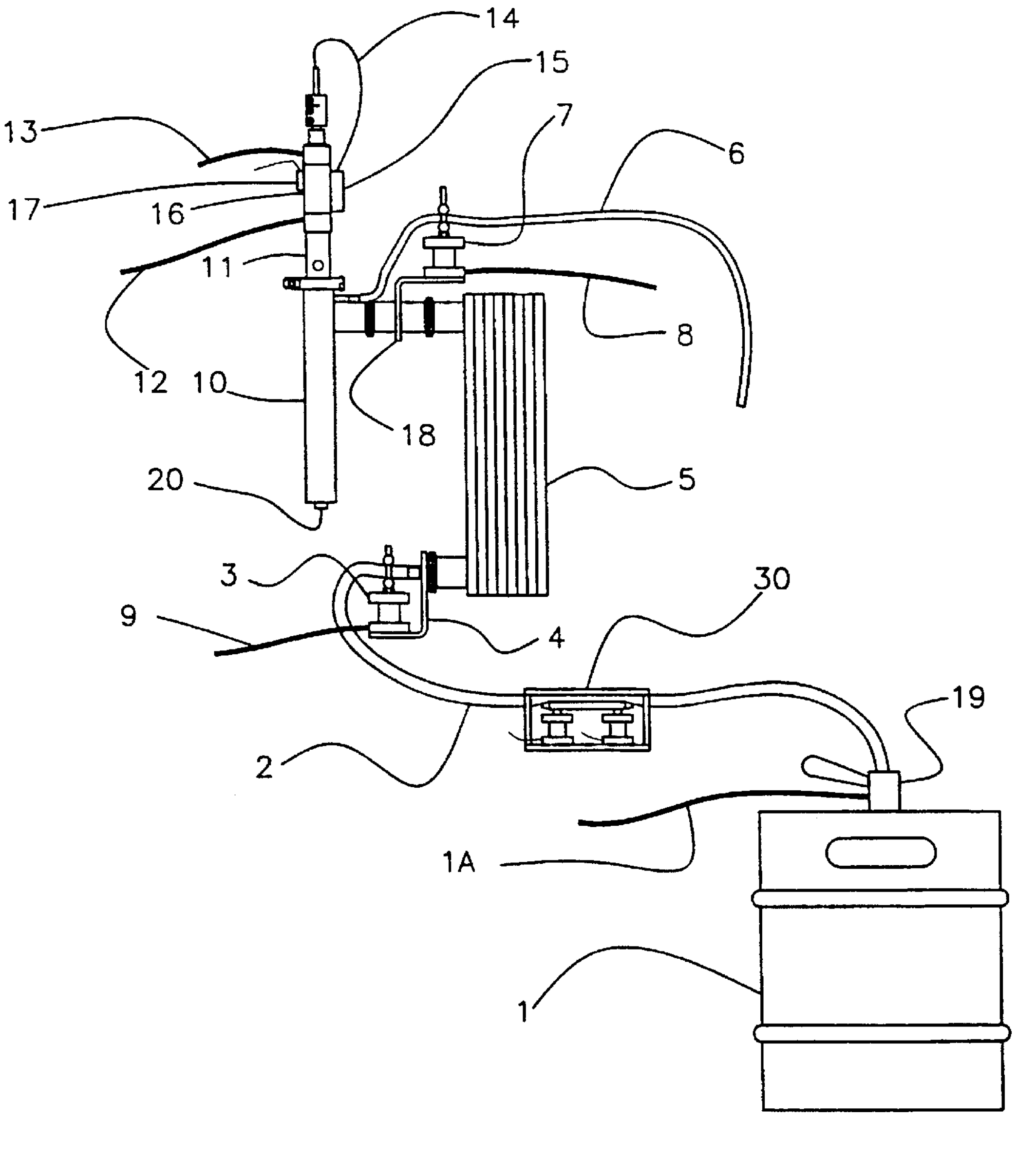
FIG. 9 is a view similar to FIG. 8 but showing a flow control valve (or volume controller) disposed between the beverage container and the main flow pinch valve.

Various embodiments of the high speed beverage dispensing apparatus are shown in the various figures. In these figures, common reference numerals are used for common parts. With reference first to FIGS. 1–5, the bulk supply container is a beer keg 1, there being a beer line 2 extending from the keg tap 19 through a main flow pinch valve 3 to a side feed entry or inlet port 10.1 of a filling nozzle or nozzle fill tube 10. The valve 3 is supported on a bracket 4 which may be secured to the port 10.1 or to heat exchanger 5 (FIG. 8). At the upper end of the nozzle fill tube 10 is a small flow tube 10.2 (FIG. 2) to which is connected a pressure control line 6. A pressure control pinch valve 7 carried by a mounting bracket 8 engages the tube in a manner which will be more fully discussed below. The valves 3 and 7 are pneumatically operated valves and to this end they are connected to air lines 9 and 8, respectively. The other end of the air line 8 is connected to pressure control solenoid valve $V_1$, which is in turn coupled to electronic controller EC (FIG. 6) and more specifically to a pressure control regulator $R_1$. Similarly, the other end of air line 9 is connected to main flow solenoid control valve $V_2$, which is in turn coupled to a main flow control regulator $R_2$.

Mounted within the nozzle fill tube 10 is a hollow operating rod 39 having a piston (not shown) on an upper end portion, the piston being mounted in a nozzle actuation air cylinder 16. Air lines 12 and 13 extend between the air cylinder 16 and a filling nozzle solenoid valve $V_3$ which is in turn coupled to regulator $R_3$. The rod can be moved up or down or be held stationary. Its position can be determined by a nozzle position encoder reed switch 17 which sends an electrical position signal to the electronic controller EC. In its up position shown in FIG. 4 the bottom of the tube 10 is sealed by a nozzle plug. The nozzle plug consists of an actuator tip 22 and an actuator tip O-ring 21 (FIG. 5), the actuator tip being carried by the operating rod 39. A centering spider 23 (FIG. 2) insures that the nozzle plug 21, 22 will properly seat when the plug is raised to its closed position, and will remain centered when it is lowered to insure even distribution of the beverage being dispensed.

Figure 5:
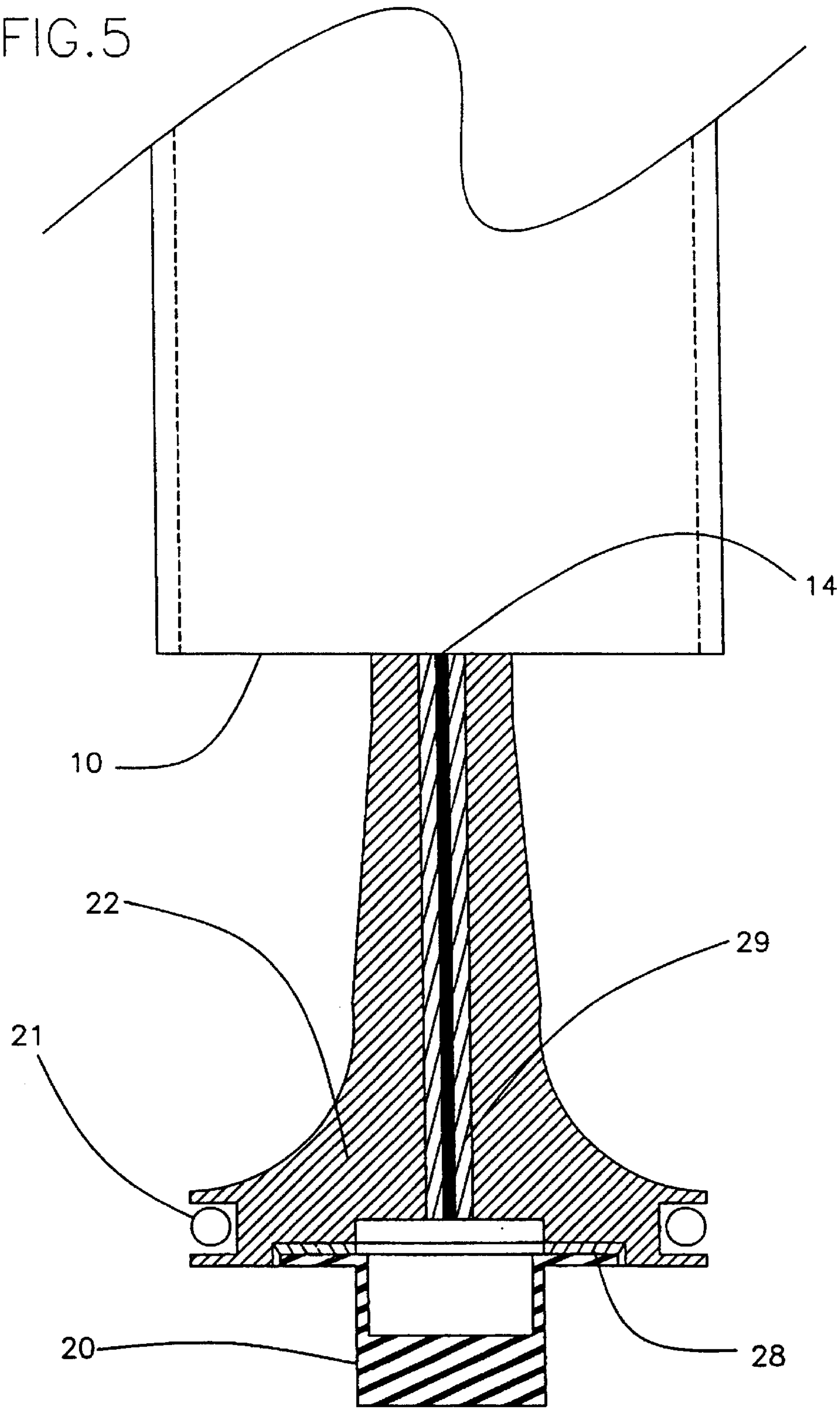
FIG. 5 is an enlarged view of a portion of the structure shown in FIG. 2, the centering spider not being shown in this view.

As pictured in FIG. 5, the sealing tip of the filling nozzle (inward or outward) can be fitted with a unitized elastomeric membrane with an external elastomeric operator block or button, the deflectable rubber assembly being fitted and glued to the nozzle plug. This device is for the purpose of starting the dispenser when the inside bottom of a serving vessel is pressed up against the button. This structure is known in the commercial art and is not novel.

The specific mechanism of actuation acted upon by the deflectable rubber button 20 shown in FIG. 5 is novel. It consists of a plastic or glass fiber of the type used in fiber optic devices, and may be a fiber optic fiber bundle 14 of several fibers within a sheath. At its lower end it is secured in place by epoxy filler 29. The rubber button or fiber actuator boot is secured in place by RTV silicone sealant 28.

Figure 2:
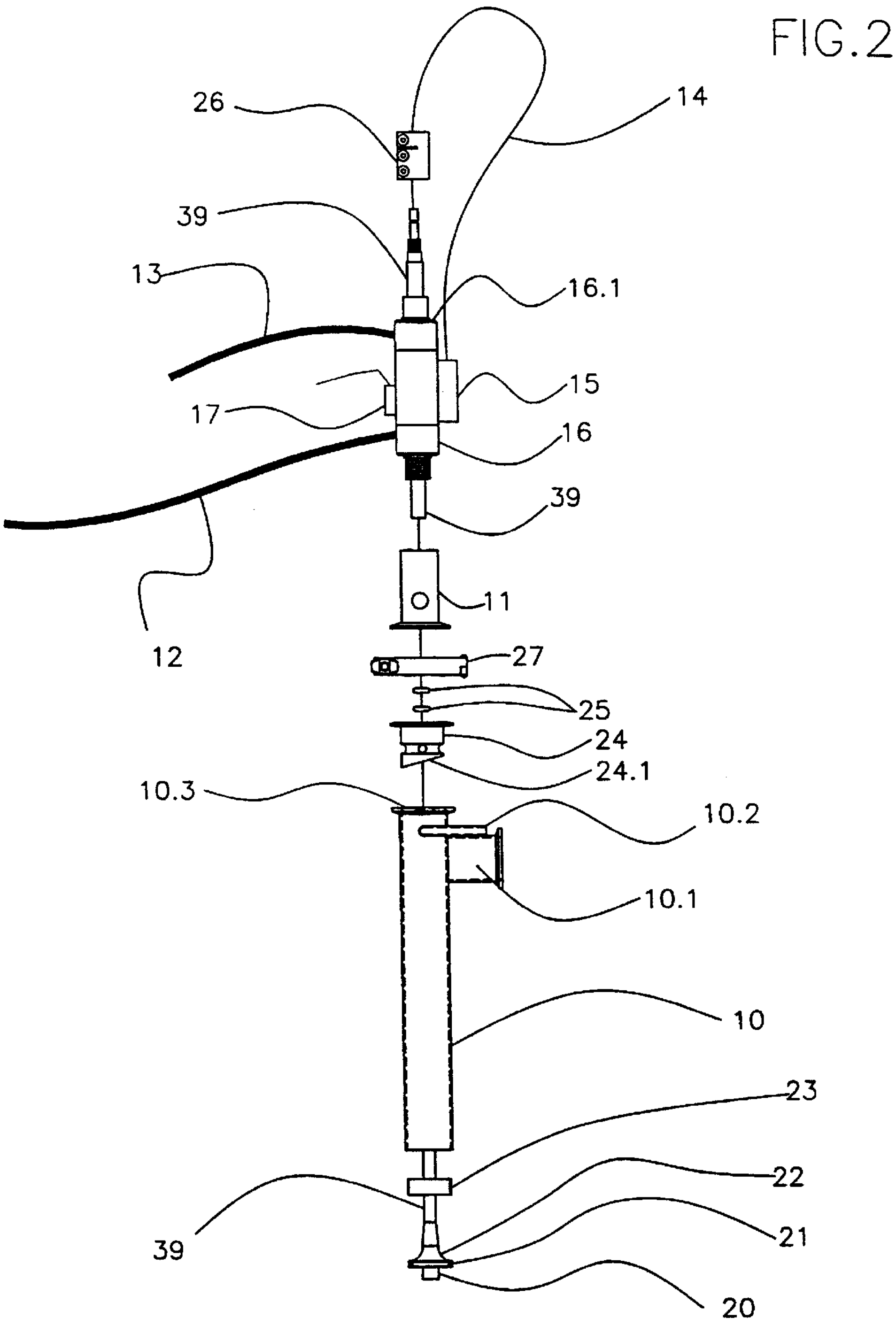
FIG. 2 is an exploded view of a nozzle assembly shown in FIG. 1.

As pictured in FIG. 2, the fiber runs up through the hollow operator rod 39 of the nozzle and emerges at the top of the nozzle to be connected to an optical amplifier 15 which converts the optical signal transmitted through the fiber into an electronic grade output.

In operation, modulated infrared light is transmitted from the amplifier down the fiber. When the rubber button is displaced toward the fiber tip by contact with a drink cup, the amount of light reflected off of the inner surface of the rubber button and back up the fiber to the amplifier is increased. This increase in light is detected by the amplifier and the electrical output to the dispenser controller constitutes a start signal.

Mounted within the tube 10 adjacent the side port 10.1 is a displacement plug 24. O-rings 25 are mounted in plug 24 and prevent liquid from flowing above the plug 24. A clamp block 26 is mounted on the upper end of the rod 39. A nozzle bridge 11 (FIG. 2) is secured at its upper end to an upper flange 10.3 on fill tube 10 by a tri-clamp fitting 27.

Fitted to the pressure control port on the upper portion of the filling nozzle and communicating to it is a small flow tube 10.1 (FIG. 2). This tube is connected to a small diameter flexible tube 6 which passes through a valve 7, preferably a pinch valve, which may be smaller but otherwise similar in detail to the main flow valve 3. This second pinch valve is termed the pressure control valve. This valve may also be encoded so that its open or closed position or flow status can be electronically detected by the dispenser control electronics, shown at EC in FIG. 6.

The main flow control valve and the pressure control valve can be of many suitable and known forms but are preferably dual anvil fast-acting pinch valves, typically actuated by pneumatic cylinders. The particular form of pinch valve is unique and novel and is fully disclosed in WO 98/31935. This form of pinch valve is particularly suited on several counts for on-off valving service of carbonated beverages in the present invention. First, it provides for a dual floating anvil geometry which provides for essentially symmetrical compression of the liquid flow tube and thus a symmetrically shaped flow aperture through the valve. Second, it provides for more than ninety percent of the flow area through the open pinch valve, as defined by the area of the uncompressed round flow tube, even though the tube remains partially compressed and captured by the dual round compression anvils. Third, it provides for a high speed of opening to a full open position. These features allow this form of pinch valve to serve as a liquid flow control valve in carbonated beverage service without causing or generating outgassing or foam formation. Thus for example, it can be empirically shown that the comparatively high speed of valve operation and flow orifice opening and closing of the pressure and flow control pinch valves minimizes or eliminates foaming in the fluid flow pathway of the dispenser, such foaming with other valve types being caused by excessive flow velocity increases and hence excessive pressure drops in valve orifice and flow channels with slow changing and narrow flow pathways or apertures upon opening or closing.

The means of valve actuation is preferentially by pneumatic cylinder. However, as has been detailed in regard to the filling nozzle actuator, all known alternative conventional forms of actuation are possible and practical for use in the present beverage dispenser invention.

In operation, the system is primed or packed with a beverage, for example draft beer, by applying $CO_2$ or other gas pressure to the beverage source through tube 1A and simultaneously opening the main flow control valve 3 and the pressure control valve 7. When this occurs, beverage flows from the source 1 through the connecting line 2 and heat exchanger 5 to the nozzle 10. Gas in the nozzle tube or barrel is displaced and exits via the pressure control valve line 6, as does the foam and mixed gas-liquid phase flow from the priming process. It will be understood that because the filling nozzle is in a vertical orientation and is vented to atmosphere by the pressure control valve 7 during priming, the nozzle quickly and preferentially fills with the liquid beverage with any trapped gas in the nozzle volume being readily and preferentially displaced upward and out of the pressure control valve line. Thus, this arrangement is particularly efficient, quick and effective in priming the system with liquid beverage and purging the system of gas. Further, the amount of beverage lost to priming is particularly small in volume, for example typically representing less than one part in two hundred of the volume of a common beer keg.

After a suitable amount of flow has occurred to prime or pack the system, which can be electronically defined, the pressure control valve 7 is closed, but the main flow control valve 3 remains open. This completes the priming of the system and places the beverage throughout the dispenser fluid flow pathway at the pressure applied to the beverage supply, generally termed the rack pressure. By way of example, in the U.S. a typical pressure of $CO_2$ gas ranging from 8 to 30 psi is generally applied to beer kegs.

A beverage dispense cycle is initiated by a start input signal to the electronic controller (FIG. 6) which can be by a wide variety of devices but most typically from a nozzle tip actuator 20 detecting the presence of a vessel such as a glass, cup, or pitcher to be filled.

Figure 6:
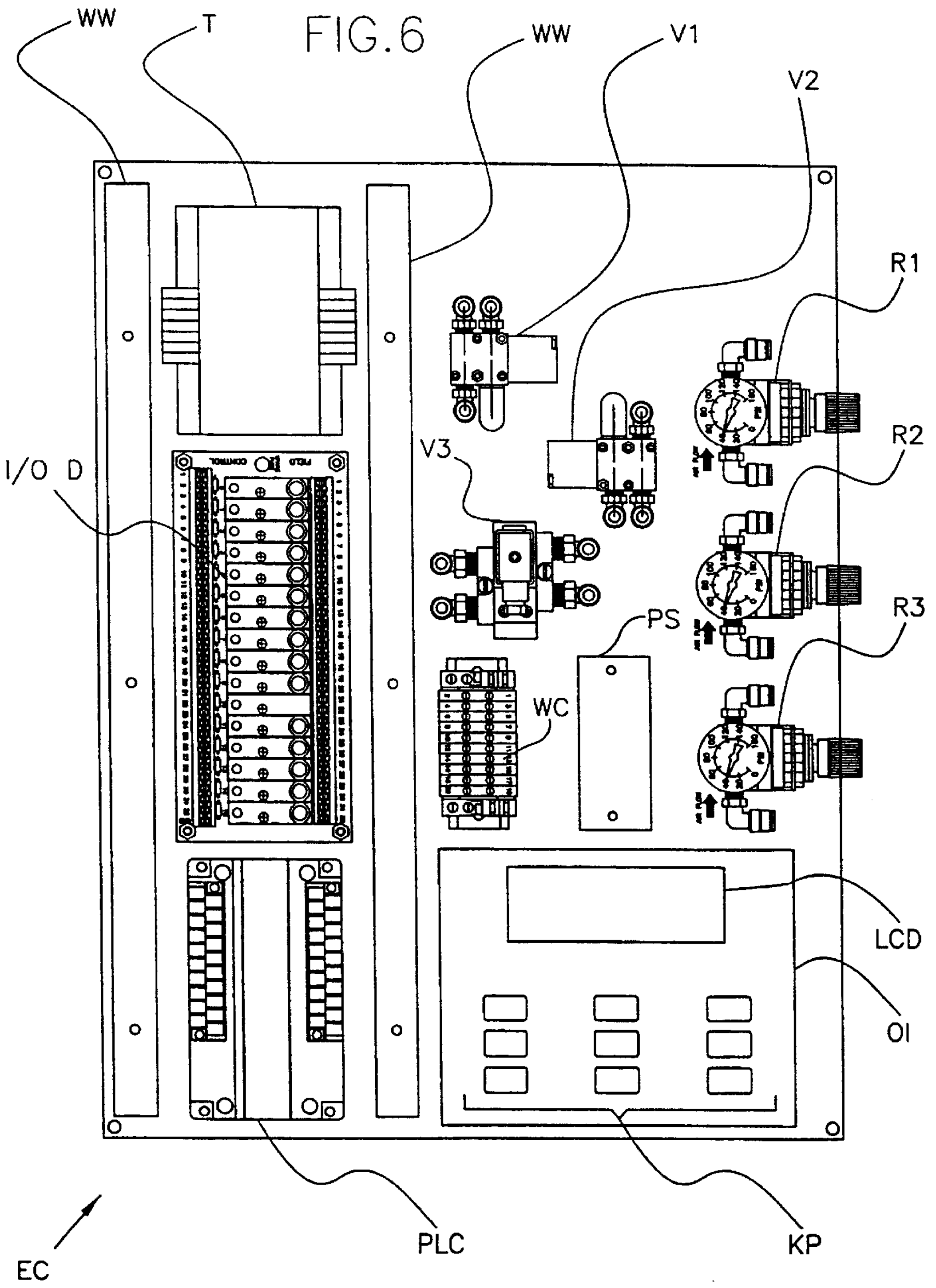
FIG. 6 is a view of the electronic and pneumatic controls which may be used for the operation of the system shown in the various figures.
Figure 7:
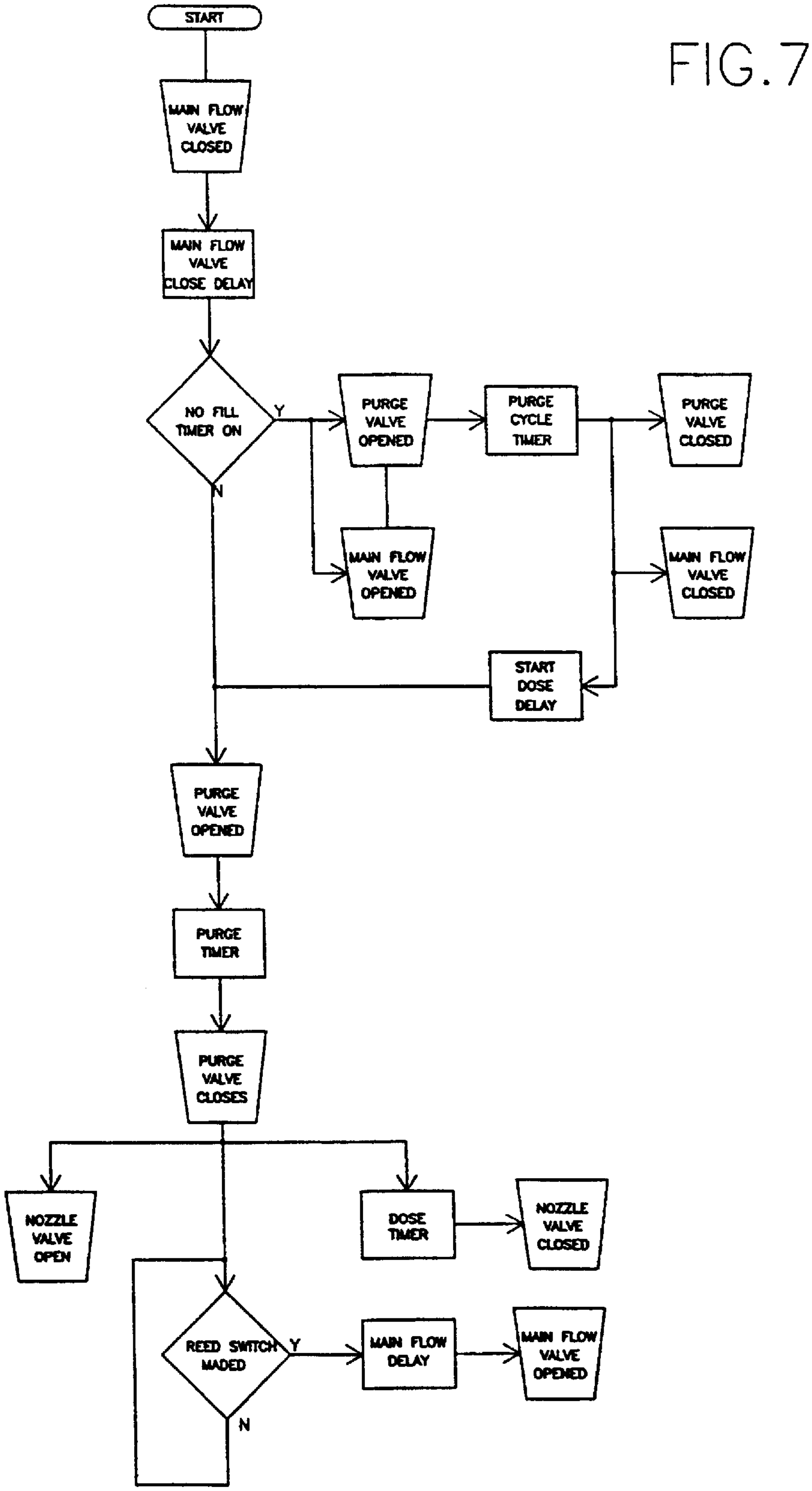
FIG. 7 is a flow chart illustrating the operation of the system of this invention.

The electronic controls provided with the dispenser of the present invention are integral to its operation and function, and are to a large extent incorporate on a printed circuit board indicated at EC in FIG. 6. The controls generally consist of a logic and input/output engine which can be a microcontroller and associated hardware or a programmable logic controller PLC, or a PC or the like. The controls also include an operator interface OI, also termed a man-machine-interface (MMI) which generally consists of an input/output capability such as a membrane keypad KP and a display, such as a multi-line LCD display. Other components of the electronic controller include input/output drivers I/O D, a transformer T, a power supply PS, wire connectors WC, and wire ways WW.

The design of the controls for the present dispenser invention are unique in providing extensive grouped parameters of machine setup, termed recipe setup, as well as an extensive suite of diagnostic parameters and capabilities. The design also accommodates remote access and control and status polling. A recipe can be created for each beverage and stored in controller memory for use as required.

The numerous and particular functions of the electronic controller associated with the dispenser herein disclosed are fully detailed throughout the specification in association with discussion of the specific methods and apparatus of the invention. The operating parameters controlled include flow rate, flow controller function and settings, operating pressures, flow rate profiling, pressure control timing settings, valve actuations, pressure control sequences, dose time and volume, operating sequence and timing, filling nozzle motions, filling nozzle speeds, flow and control valves positioning and status, priming flows and times, automatic bottom-up nozzle filling motions and speeds, control of foam defining methods and sequences, clean-in-place (CIP) machine sequencing and operation, integration and control of CIP operating hardware such as cleaning pumps, and watchdog timer and supervisory functions and actuations.

The numerous diagnostic functions carried out and monitored by the electronic controller include monitor of beverage supply status, pneumatics, gas pressure, failure of filling nozzle or flow control valves to open or close properly, high or low beverage pressure, high or low AC mains voltage, and battery power status in portable versions of the dispenser. Audible, visual and data alarms (not shown) are provided for annunciation of out of specification conditions.

The electronic controller also annunciates required CIP intervals based either upon number of dispense cycles or elapsed operating time, and proper maintenance intervals and maintenance items based upon number of dispense cycles or elapsed operating time.

The electronic controller can also be linked into a network array with other beverage dispensers, or to a remote control node. This linkage is carried out using conventional data integration hardware and software protocols. When linked, the device can be remotely set up and configured by selecting and entering any desired beverage operating recipe in the current machine operating parameters, and the machine can be status polled for operating status and condition, including fault conditions. The controller also has a self-teach capability with regard to some operating parameters as detailed elsewhere in the specification.

The electronic controller, upon receipt of a start input signal, first causes the main flow control valve 3 to close, thus isolating the beverage source from the system beyond the valve. After the main flow control valve is closed the pressure control valve 7 is opened briefly and then closed. This has the effect of removing all or part of the foam or gas which may have accumulated at the top of the nozzle 10 since the previous dispensing cycle. The open interval is electronically defined and can be varied as desired, the varying time having the direct effect of allowing determination of the amount of foam desired in or on top of the drink to be dispensed. The principles and mechanisms for this control will be extensively discussed in a later section of this specification.

The opening and closing of the pressure control valve also has the effect of reducing the pressure inside of the nozzle and communicating structure to a level below the rack value. The pressure level can be defined by the opening period or duration of the pressure control valve. Most typically, the pressure is lowered to a level at or near atmosphere. However, this is electronically controllable and variable as desired, the varying open time of the pressure control valve having the direct effect of allowing determination of the amount of foam desired in or on top of the drink to be dispensed. A more complete discussion of this foam defining methodology will be found further on in this specification.

After the pressure control valve has cycled as described, the filling nozzle is opened. This opening is preferably pneumatically defined and controlled in such a way as to assure that the downward motion of the nozzle plug 21, 22 is relatively gentle. A sensor 17 on the nozzle actuator critically detects the completion of nozzle opening, at which time the main flow control valve is opened. The sensor may be a nozzle encoding reed switch. It is important to understand that by first lowering the pressure of the beverage in the nozzle to a level at or near atmospheric pressure, or to a desired level below the rack pressure, the filling nozzle can be opened with little or no pressure mediated flow occurring simultaneously with opening. This is because of the action of the pressure control valve to cause a low or lowered pressure in the nozzle and because at the time of nozzle opening the main flow valve remains closed.

Opening of the main flow control valve allows beverage to flow through the system at a rate defined by the rack pressure. Note that because the nozzle was opened with the beverage in the nozzle at low pressure, no violent or turbulent flow into the cup or glass occurs as a result of nozzle opening.

After the main flow control valve is opened, flow ensues for a period of time which serves to establish a dispensing dose quantity on a time-pressure basis, for example 2 seconds to fill a beer cup with 20 oz. of beer and ½ inch of foam.

At the completion of the dose flow time, the filling nozzle is closed. The closing motion is unique and novel and critically consists of closing the nozzle at a fast rate of motion. This is important in that as the nozzle closes its flow orifice diminishes and the flow of beverage therefore accelerates in velocity. This increase in velocity can result in turbulence within the volume of dispensed beverage and the turbulence can induce the formation of substantial amounts of foam. This phenomenon is largely avoided or reduced to an absolute minimum by virtue of the fast nozzle closure.

The closure of the nozzle completes a dispensing event and the main flow valve remains open to insure that the beverage in the system remains at rack pressure and is thus preserved in character and quality relative to preventing substantial out gassing or foaming of the beverage within the dispenser fluid flow pathway.

In a variant of the basic operating sequence described initially, it is possible, at the end of the dose defining flow time to stop beverage now by first closing the main flow control valve, followed immediately thereafter by closure of the filling nozzle. However, when this operating valve sequence is utilized, it is essential that the main flow control valve be reopened after the filling nozzle has completely closed so that the entire dispenser fluid flow pathway is reestablished at the rack or system operating pressure.

It is important to note still another variant to the basic dispense sequence described above. At the end of each dispense cycle, a watchdog timer is started in the dispenser's electronic controller. This timer may also be alternately termed a quality timer, an outgas timer, a re-prime timer, or a purge timer. The purpose of this timer is to measure the duration of time between successive dispenser events. It will be understood by one knowledgeable in the art that in a closed and beverage filled dispenser fluid flow pathway at rack pressure, some of the carbon dioxide gas dissolved in the liquid will come out of solution over time. This process is dependent upon numerous physical variables but is well known in the art. Thus, over time, gas pockets or bubble trains or groupings can form on the inner surfaces of the fluid flow pathway. As these bubbles merge and combine, they eventually migrate upward to the top of the containment structure which, in the present embodiment, is the top of the filling nozzle. Thus, over time, an undefined gas or mixed phase pocket can form. The purpose of the novel watchdog timer in this instance is to initiate a short re-prime sequence in the dispenser if sufficient time has passed to allow an unwanted or undefined gas pocket to form at the top of the nozzle. This restores the system to a known, fully primed condition thus assuring tight repeatability of all dispensing functions.

If a start event is noted by the controller before the expiration of the watchdog time, which can be varied as desired and is generally dependent upon the particular beverage being dispensed, the watchdog timer is reset and begins a new watchdog period at the end of the dispensing cycle.

In the instance where the watchdog time has expired and a start signal is entered, the main flow control valve remains open and the pressure control valve is briefly opened. This sequence is akin to the priming sequence previously described, and is independently definable in the control sequence. The purpose of this sub-routine is to re-initialize or reestablish known pressure and gas conditions in the dispenser fluid flow pathway. The specifics of this methodology will be extensively discussed further on.

After the watch dog timer mediated re-prime sequence has been completed, the dosing event proceeds, and the main flow control valve is closed, the pressure relief valve is closed, the pressure relief valve is cycled, the filling nozzle is opened and a defined dose of beverage is dispensed, all in a manner identical to that previously described. Additional components will be discussed below.

Considering FIG. 8 of the second embodiment, a source of beverage in container or keg 1 is connected to the flexible tube 2 connecting to the main flow control valve 3. The main flow control valve is most preferably and typically a dual anvil fast-acting pinch valve, actuated pneumatically. This valve type will be extensively discussed further on in this specification. The main flow control valve may be encoded so that its open or closed position or flow status can be electronically detected by the dispenser control electronics.

In the case where the main flow control valve is a pinch valve, the flexible line continues through the valve and is coupled to a heat exchanger 5 using a smooth walled sanitary connector generally known as a tri-clamp fitting. The valve 3 is supported on the heat exchanger 5 by a mounting bracket 4.

The beverage emerges from the heat exchanger, typically through a tri-clamp fitting with a diameter as large as practical to limit absolute flow velocity in the conduit which connects the heat exchanger to the positive bottom shut-off beverage filling nozzle 10. The filling nozzle is coupled to the heat exchanger using a tri-clamp connection.

The filling nozzles utilized in the embodiments of the beverage dispenser invention herein disclosed have several unique and novel features.

Although many varied types and geometries of active valved filling nozzles can be utilized, inward and outward opening bottom shut-off filling nozzles are particularly effective in the dispenser invention. It will be understood that filling nozzles of these general types are well known and long utilized in the commercial art in association with liquid filling machines utilized in manufacturing and production settings to package liquids into containers of every kind.

One novel feature of the nozzles disclosed herein concerns the small flow tube 10.1 fitted to the upper portion of the nozzle and communicating with the lumen of the nozzle. This tube is termed the pressure control port and may be alternately termed the blow-off port, the purge port, the foam control port or the prime port. The important function of this novel filling nozzle structure is extensively detailed further on in this specification in conjunction with methods of beverage foam control possible with this invention.

Figure 21:
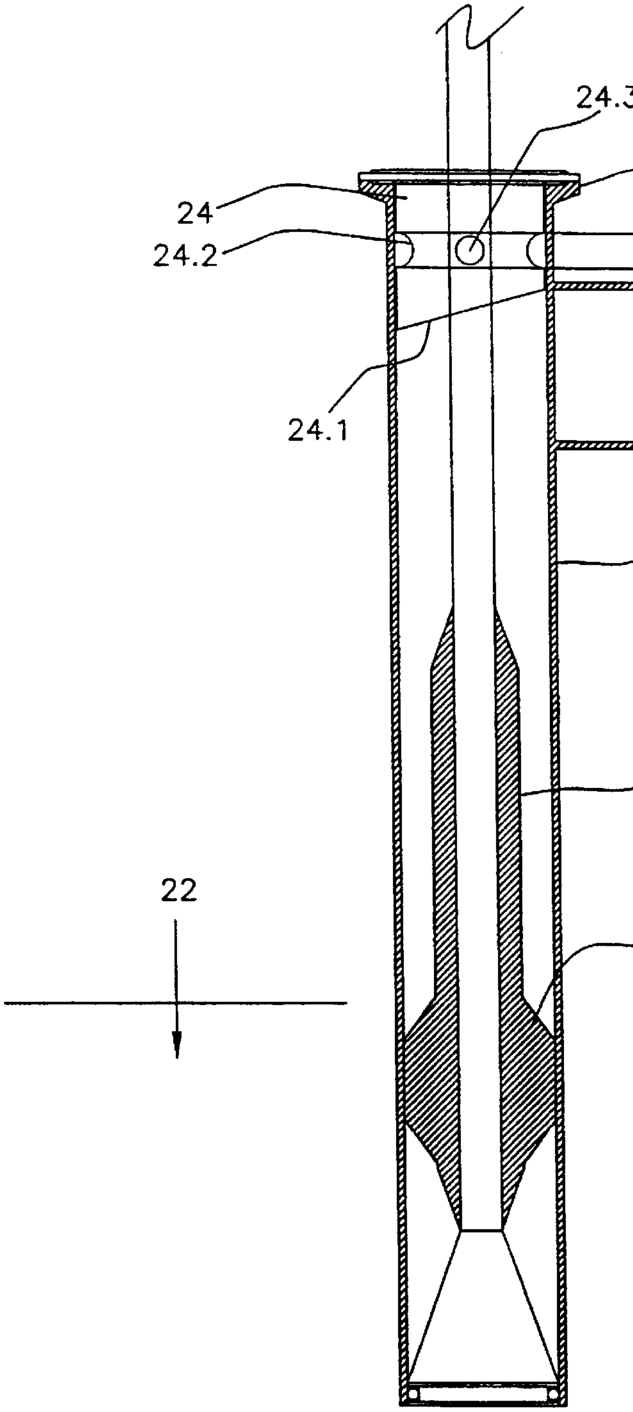
FIGS. 21 to 23A are illustrations of a nozzle tube provided with means to reduce the volume of the tube, FIGS. 21 and 22 having the volume reducer attached to the actuator rod, and FIGS. 23 and 23A showing the volume reducer being supported by the nozzle tube.

A second novel feature of the nozzles disclosed herein is the use of a beveled or angled displacement plug 24, as shown in of FIG. 2 and FIG. 21, generally at the top of the filling nozzle tube. The displacement plug eliminates the void or space above the side feed entry port of the nozzle thus largely eliminating a gas trap area. This trap exists because the top of the nozzle is gas and liquid sealed by the seal O-rings 25 best shown in FIG. 2. Thus a domed area is created which would fill with gas accumulated from a carbonated beverage if the space were not displaced by the solid displacement plug.

Figure 20:
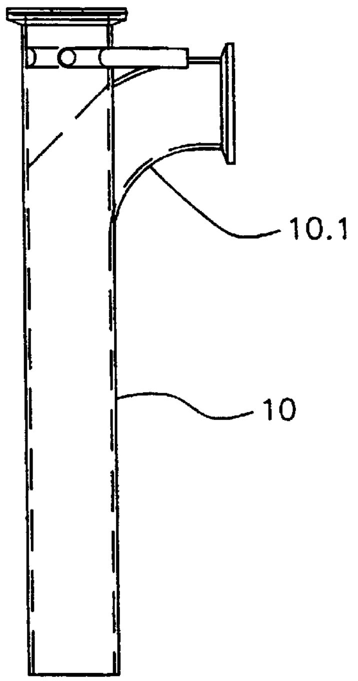
FIGS. 18, 19, and 20 show variations of the nozzle tube, FIG. 18 showing the inlet tube at right angles to the nozzle tube with the bottom face of the displacement plug at a differing angle than that shown in FIG. 2, FIG. 19 showing the inlet port at an angle to the nozzle tube, and FIG. 20 showing a curve inlet port.
Figure 19:
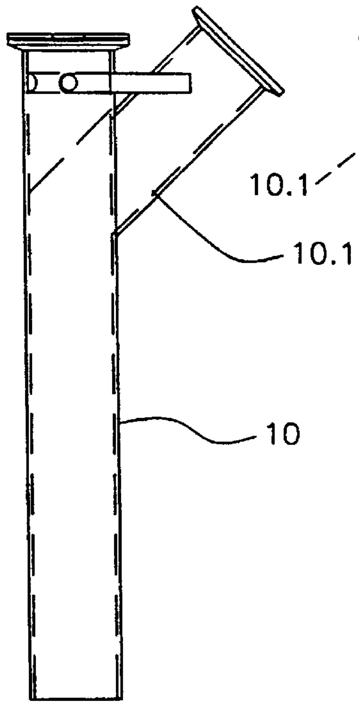
Figure 18:
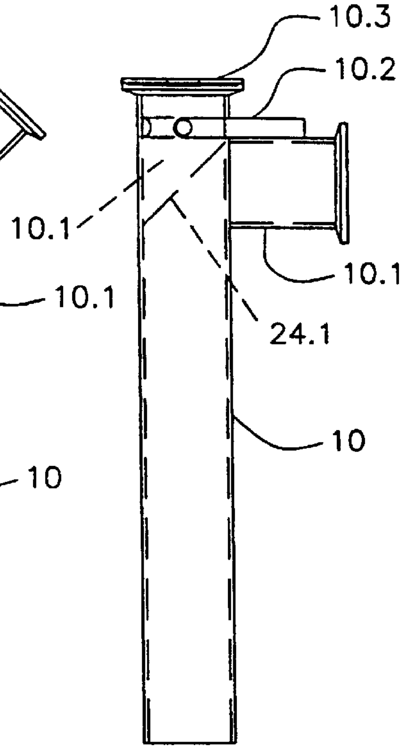

The angle of the bottom face 24.1 of the displacement plug 24 is novel and important in that it provides for a more gradual deflection and turning of the flowing beverage as it enters the nozzle tube from the side port. This reduces flow pressure changes and kinetic flow trauma which helps to prevent unwanted foaming of the carbonated beverage. In FIG. 2 the bottom face 24.1 is shown at a slight angle, whereas in FIG. 18 it is at a greater angle. FIGS. 19–20 show other novel geometries of an inlet tube 10.1 for assuring gentle flow through the nozzle tube 10. Thus, in FIG. 19 the side feed entry pot 10.1 is at a 45° angle to the inlet tube 10, whereas in FIG. 20 the inlet port 10.1 is curved.

As can best be seen from FIG. 21, the annular groove 24.2 novelty cut circumferentially in the displacement block coincides with the pressure control port 10.2 when the plug is installed in the nozzle tube, thus aiding flow of gas and foam around the plug and out through the port. The passage hole 24.3 from the annular groove to the operator rod hole (no number) piercing the plug centrally from top to bottom further promotes ease of movement of gas and foam toward the pressure control port.

As will be detailed extensively further on, the nozzle is novelly encoded such that its full open or flow position or status can be electronically detected. The encoding can also define initial opening of the nozzle.

The filling nozzles preferably utilized in the present invention are most typically actuated pneumatically. This is because of the inherent availability of pressurized gas in most carbonated beverage installations and by virtue of the ruggedness and simplicity and low cost of pneumatics. It is also possible to achieve reliable and reproducible motion rate control using precision orifices or servopneumatic controls and techniques. It is also provided herein for other actuation methods including use of all types of rotary motors, use of solenoid operators, use of voice coil operators and use of linear motors.

Figure 3:
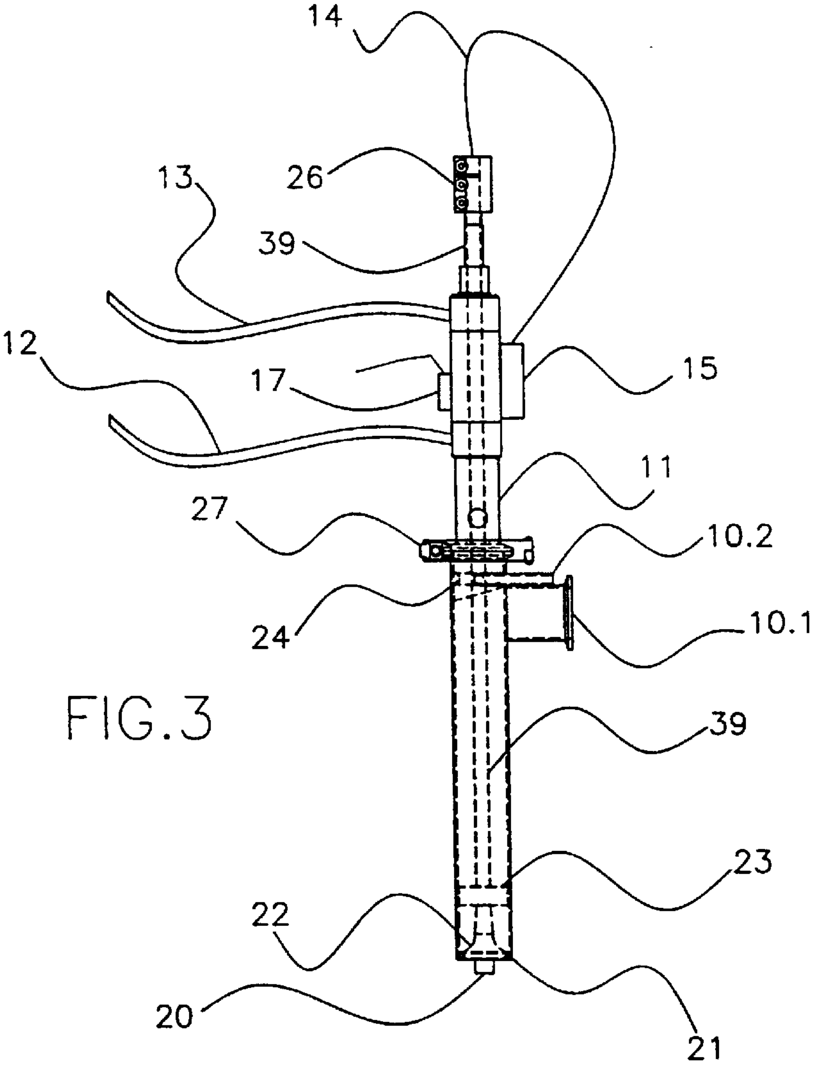
FIG. 3 is a view similar to FIG. 2, but showing the parts in their normal operative position when a beverage is not being dispensed.
Figure 4:
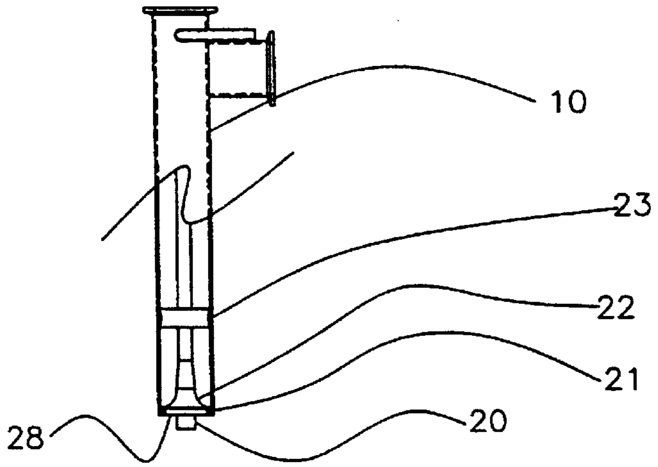
FIG. 4 is an enlarged view of the lower portion of the nozzle assembly showing a conventional actuator tip in a closed position.

It will be understood that when the beverage dispenser is in a non-flow condition shown in FIG. 3, the beverage, often beer, is held in the fluid flow pathway. Thus, the smaller the lumen volume of the nozzle, the less beer must be held in the nozzle, the nozzle being subject to an increase in temperature as chilled beer warms up over time. This quantity of beer subject to warming in the nozzle can be novelly reduced by several means as shown in FIGS. 21–25.

Figure 22:
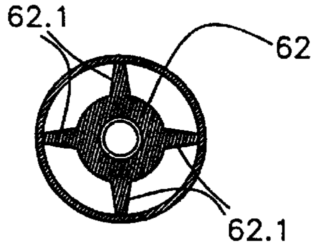

In FIGS. 21 and 22, a self-centering displacement tube 62 is provided which is uniquely designed to drop over the operator rod of the nozzle, displacing a significant volume of the nozzle lumen. The tube may include an integral set of centering fins 62.1, or operate with a separate centering spider (not shown).

Figure 23:
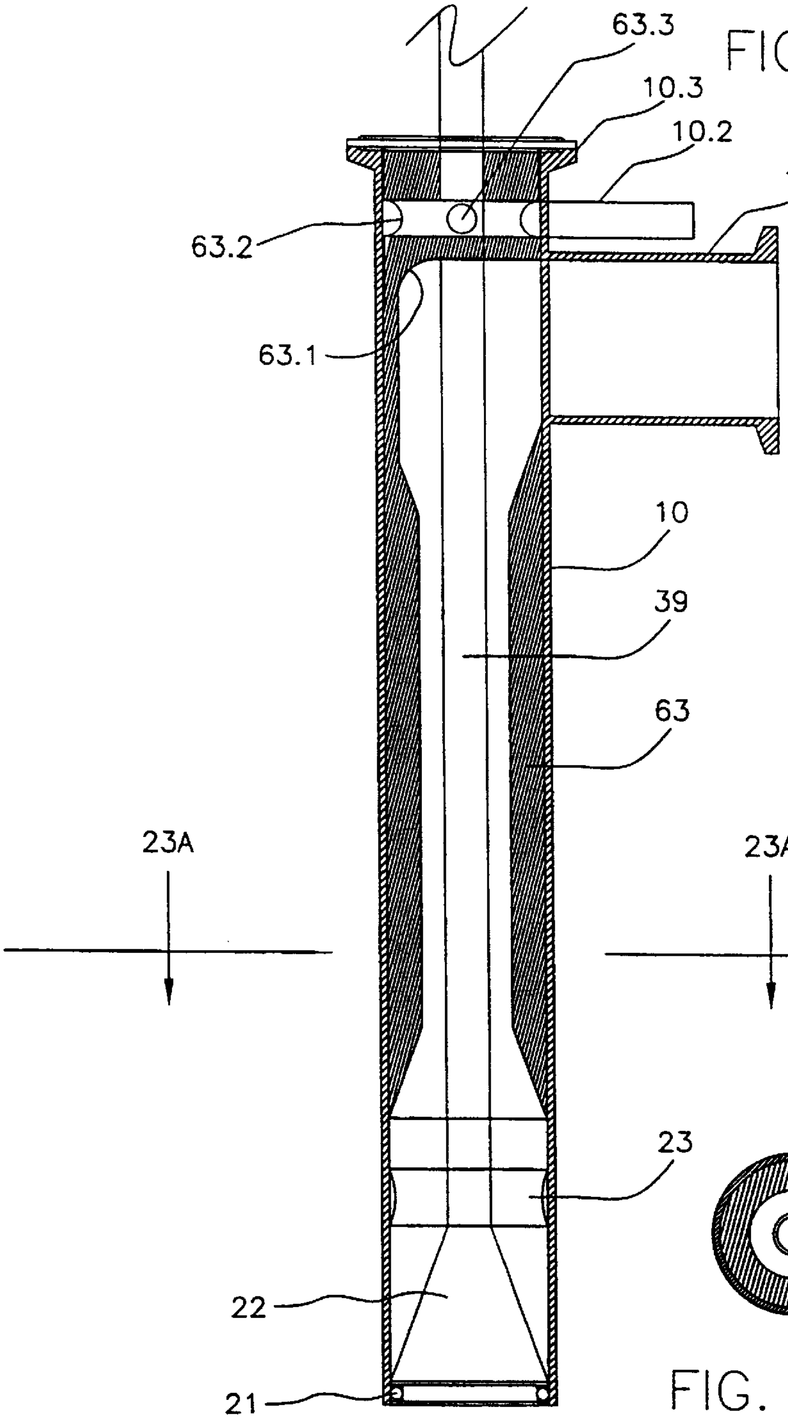
Figure 23A:
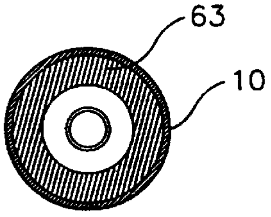

In FIGS. 23 and 23A a novel unitized displacement sleeve 63 is fitted to the nozzle tube from the top, integrating the displacement function and the flow contouring requirement of plug 24. The unitized displacement sleeve includes, in addition to the displacement portion, a curved face 63.1, an annular groove 63.2, and a passage hole 63.3 which function in the same manner as the corresponding parts of the displacement plug 24. In the designs of FIGS. 21–23A the large square area of flow at the nozzle tip is not compromised or reduced. In these figures the fiber optic fiber bundle is not shown.

Figure 24:
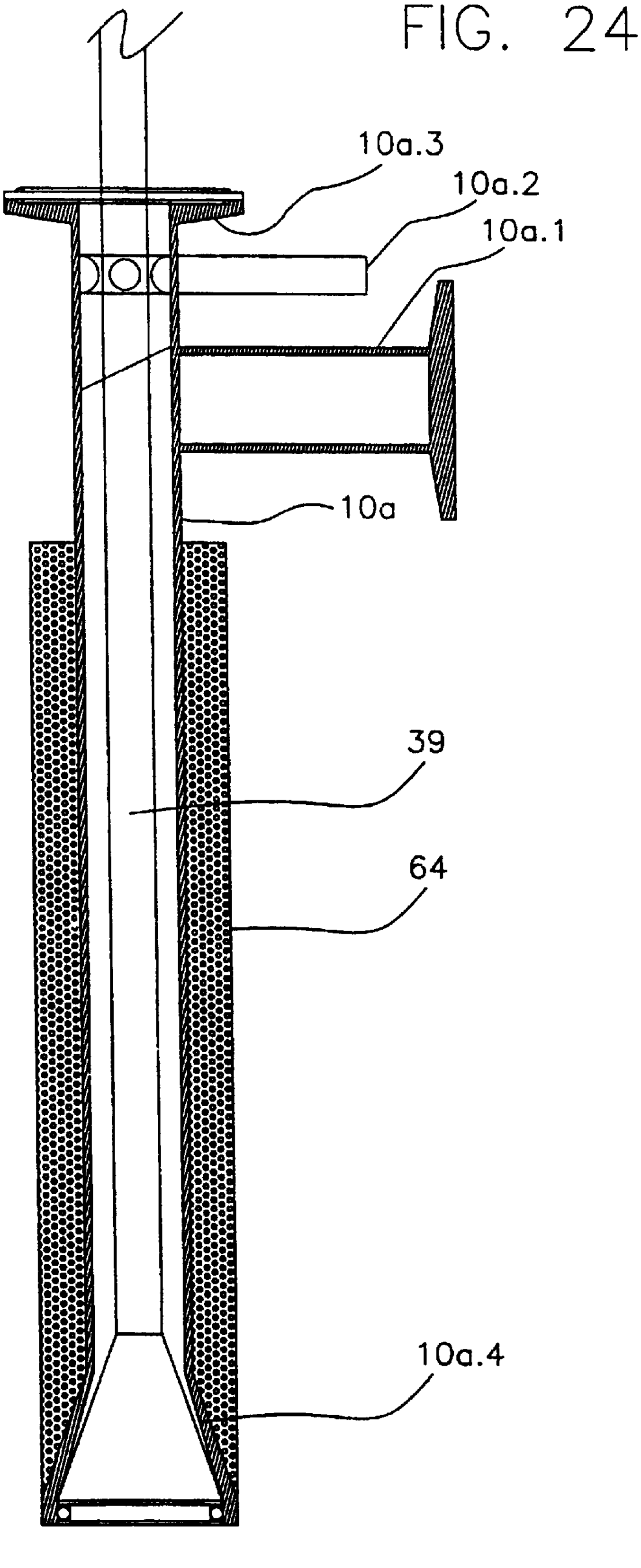
FIGS. 24 and 25 are further illustrations of a nozzle assembly having a reduced diameter, wherein the tip is flared to reduce agitation of the fluid being discharged, and wherein the tube is provided with insulation.
Figure 25:
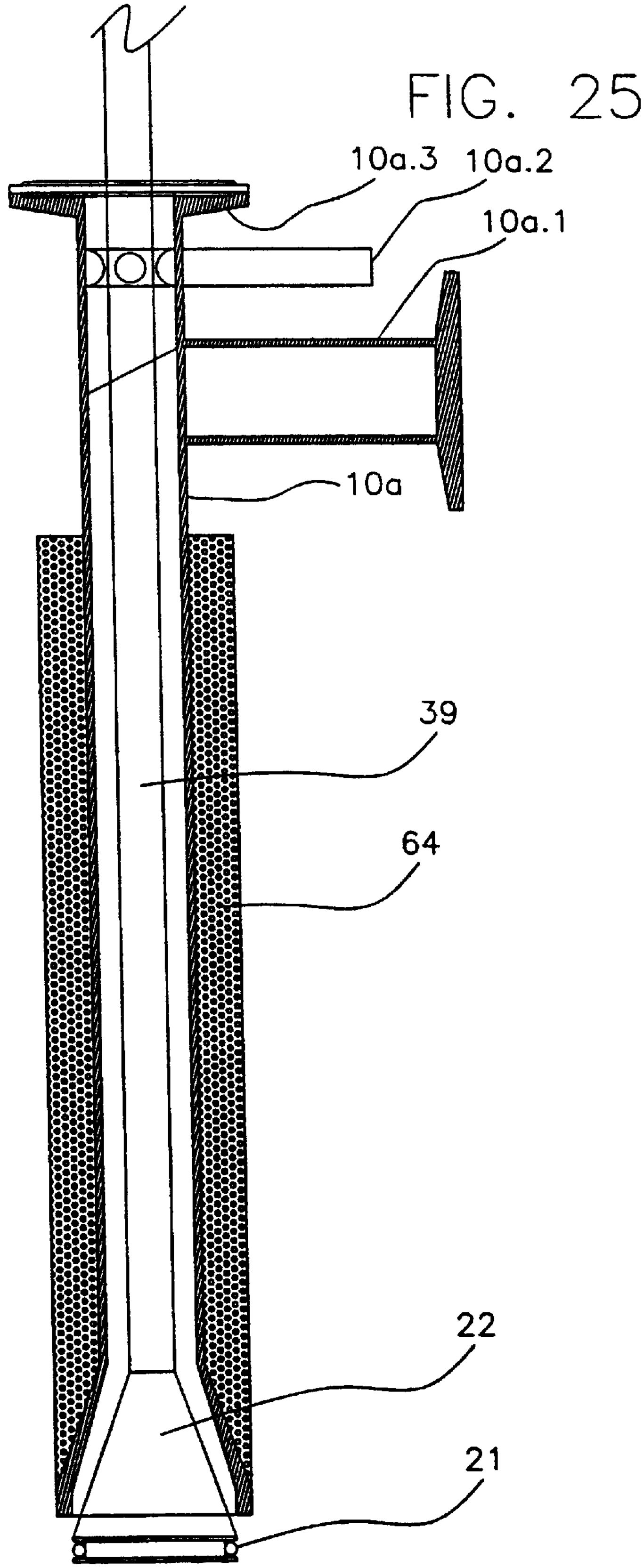

Still another unique and novel feature of the filling nozzles of the present invention is shown in FIGS. 24 and 25. The nozzle pictured in these figures has a main flow tube 10*a* which is sheathed or wrapped in thermal insulation 64. This design substantially reduces the rate of warming of the beer held in the nozzle for extended periods. The insulation can be of many forms and can be bonded and sealed to the nozzle for sanitary service such that it can be immersed in the beverage container being filled. An external stainless steel sheath (not shown) covering the insulation can also be welded to the bottom of the fill tube thus providing an immersible design. In this instance, lumen volume is reduced by the use of a reduced internal diameter main flow tube 10*a*, with a bell 10*a*.4 or flair geometry at the nozzle tip to again establish the large annular flow area which advantageously allows low velocity beverage flow into the serving vessel or cup. It will be understood that reducing the volume of beer in the nozzle that can warn over time and/or reducing the rate of warming allows a drink dispensed after a standby period to be lower in temperature than would otherwise be the case.

Figure 26:
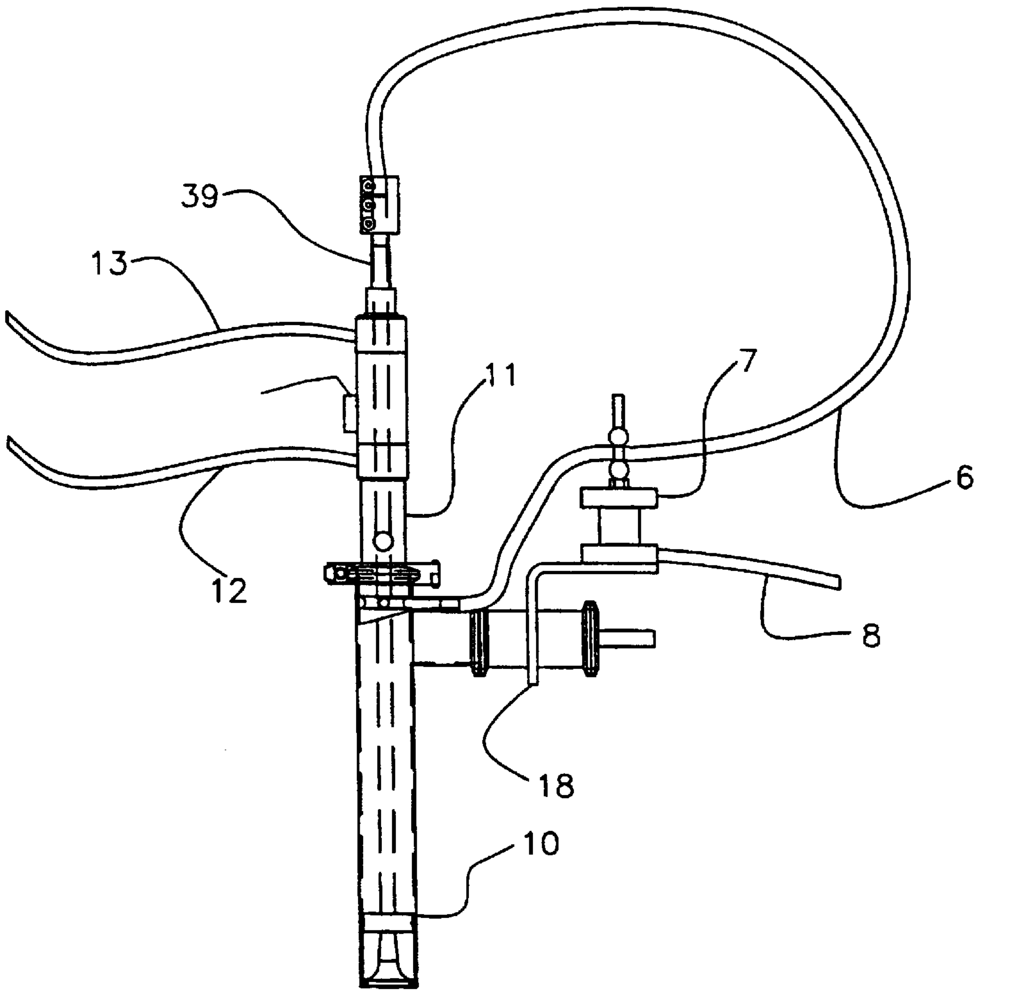
FIG. 26 shows a variation of the purge tube design with the purge beverage and gas being discharged into the operator rod for direct discharge into a beverage vessel.

Another embodiment of the beverage dispenser of the present invention is shown In FIG. 26. This filling nozzle design allows the small quantity of foam originating from the upper portion of the nozzle prior to a fill as a consequence of operating the pressure control valve to be connected via a flexible tube 6 to the top of the nozzle operator rod 39. The operator rod in this embodiment is hollow and communicates all the way down to and through the nozzle tip. This design allows the small discharge of beverage to enter the serving container rather than be discharged from the pressure control valve flow tube 6, thus further reducing beverage waste and loss.

It is an object of the present invention to disclose unique and novel methods and apparatus for controlling and establishing a defined and specified amount of foam in reproducible and automatic ways so that a desired amount of foam can be repeatably and automatically created in a successive series of dispensed drinks. These numerous methods will now be discussed.

As previously disclosed, the pressure control valve 7 as pictured in FIG. 8 may be used to control and define the desired amount of foam in a dispensed drink. The pressure control valve may also be termed the blow-off valve, the purge valve, the foam control valve, or the prime valve, and it fulfills all of these functions. In the drink dispense sequence previously described the filling nozzle is first isolated from the beverage source by closure of the main flow control valve 3. The pressure control valve is then opened for a precise and defined period. This opening period is electronically defined by the controller associated with the dispenser, typically as a controller timer function. The opening time for a particular beverage type or brand is defined as one of numerous dispenser parameter variables that define drink dispense volume and drink character or presentation.

The pressure control valve 7 is connected through a fluid tight conduit 6 into a flow tube 10.1 located generally at the top of the filling nozzle 10. The flow tube connected to the nozzle is termed the pressure control port and alternately termed the blow-off port, the purge port, the foam control port, or the prime port.

With the main flow control valve 3 closed and the pressure control valve 7 open, flow of a carbonated beverage, and particularly beer, occurs from the nozzle through the pressure control port and conduit to atmosphere. It will be understood that if the portion of the dispenser fluid flow pathway on the dispensing nozzle side of the closed main flow control valve were filled with a still liquid such as water, and given that the fluid flow pathway is essentially rigid and undistended, little if any flow would occur through the pressure control valve pathway because the water is, in practical terms, incompressible and thus no motive force to cause flow would be present even though the water would be at the rack pressure previously defined. But, in the case of a carbonated beverage, the dissolved gases provide a means to effect flow by virtue of their accumulation and ability to compress and expand as a function of applied pressure as explained in the discussion of system priming, and also by virtue of the outgassing that occurs with any sudden reduction of pressure of a highly gas solvated liquid. Thus, it will be clear to one skilled in the art that the pressure control valve, when opened with flow from the beverage supply blocked, allows the pressure in the filling nozzle and adjacent structure up to the main flow control valve to decrease as a function of flow induced by the expansion of the trapped gas with the decreasing pressure. The pressure can be empirically shown to be at rack value prior to opening, and to decay or decrease toward atmosphere at a finite rate as a function of the duration for which the pressure control valve is open. Thus, it is clear that by electronically determining the open time of the pressure control valve, direct control of the pressure in the filling nozzle can be achieved. Therefore it is a particular novel feature of the present invention that such direct pressure control is possible and that it is predictable and reproducible with suitable controls and valve apparatus, and that at any given system or rack pressure a relationship between valve open time and resultant pressure can be mathematically defined and such relationship can be entered and stored in the dispenser electronic controls to allow direct selection of desired nozzle volume pressure at the start of a dispense event.

Because pressure can be directly controlled in the nozzle volume of the dispenser herein disclosed, direct control over a desired amount of foam in a pour of beer or other carbonated beverage is achieved. This is partially true because when the filling nozzle opens to begin the filling event, the initial flow into the serving vessel is mediated by a combination of a fixed gravimetric flow or fallout of beverage from the nozzle, and by the propulsion furnished by the gas associated with the beverage. Thus, the lower the pressure in the nozzle the lower the initial rate of flow of beverage into the serving vessel and the lower the turbulence and therefore the less the foam formed, which forms largely as a function of outgassing induced by flow turbulence.

The complete explanation for the efficacy of this method of foam control also requires an understanding of the role of gas and foam reduction effected by the pressure control valve before the start of the fill. Recall that gas and foam accumulate at the top of the nozzle. This occurs relatively quickly after each pour. When the pressure control valve opens, this foam and gas are forced out to atmosphere. Thus, the amount of foam and free gas can be altered from essentially none to a relatively defined quantity. Recall further that in a carbonated beverage under flow, foam makes foam and more foam makes more foam. Thus, when the filling nozzle opens and then the main flow control valve opens, rack pressure induced flow begins into the beverage serving vessel. During this flow period, which constitutes a defined volume dose, the amount of foam or free gas in the nozzle at the start of the fill directly influences how much foam is formed within the body of the liquid dose and ultimately how much foam is found on top of the beverage in the serving vessel.

Therefore, the first method of foam control is both by the timed opening of the pressure control valve which influences foam formation as a function of modulation of initial flow velocity or rate and also as a function of control of gas to liquid induced foam forming turbulence during rack pressure mediated flow.

It is important to note that the quantity of liquid or gas or mixed phase beverage lost to atmosphere with each beverage pour is quite small. For example, in dispensing twenty ounce servings of beer from a U.S. keg, the total weight of beverage displaced through the pressure control valve pathway typically ranges from less than thirty to no more than ninety grams for the entire keg.

An important and novel variant to the timed pressure control valve method described above is to open the valve until a defined and desired pressure is reached as determined by a pressure sensor. The sensor can be located anywhere on the downstream or nozzle side of the main flow control valve but most preferably at or near the filling nozzle. Any suitable sensor type will serve as appropriate to the pressure range and sanitary service requirement. This sensor based pressure control method provides enhanced reproducibility and pressure set point resolution but at a higher economic cost for the apparatus.

Figure 32:
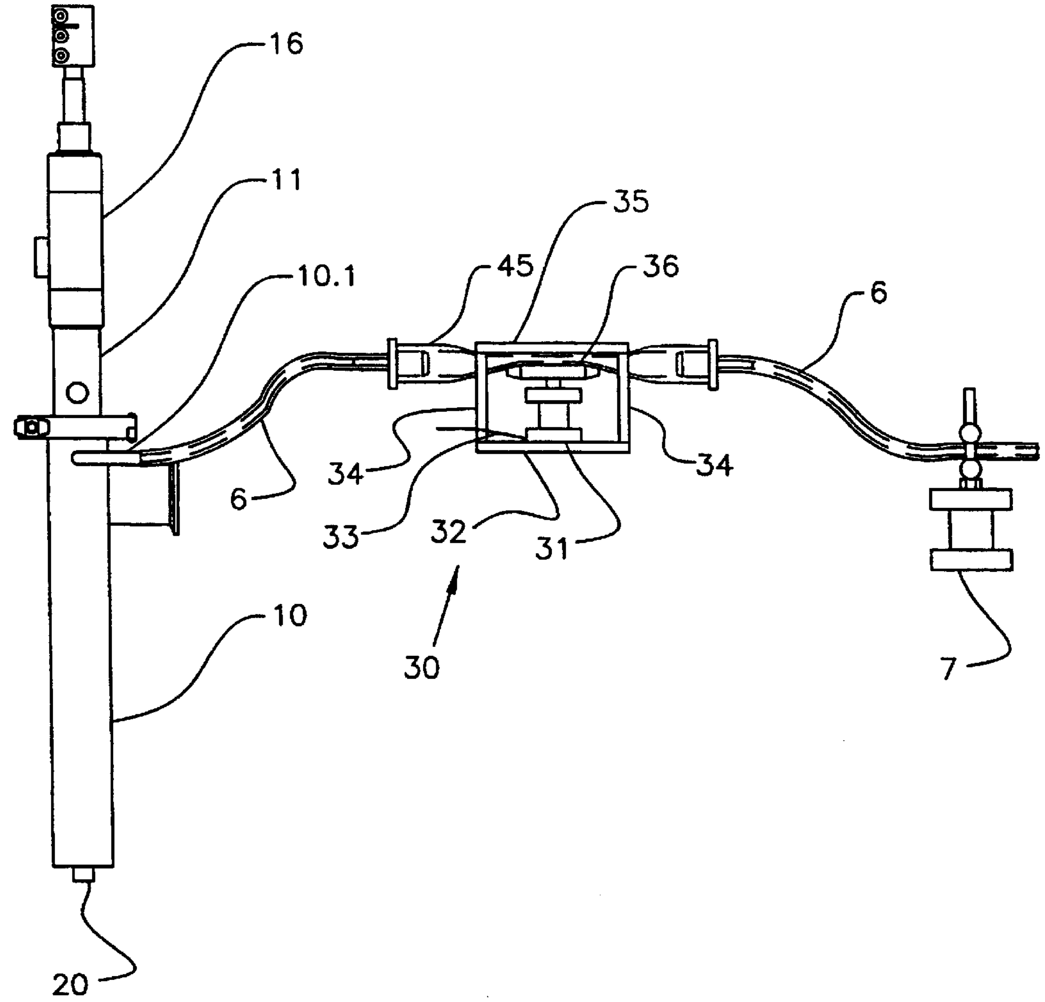
FIG. 32 shows a the application of a volume controller to the pressure control line.

Still another important variant of the timed opening of the pressure control valve to define and control foam is found in FIG. 32 which is a view of one version of the filling nozzle of the present invention in which the pressure control conduit 6 leading to the pressure control valve 7 has inserted into a device indicated generally at 30 for alternately increasing and reducing the system or lumen volume contained in the portion of the beverage dispenser fluid flow pathway on the nozzle side of the main flow control valve. The device includes a tube 45, similar in diameter to tube 2, which is coupled to upstream and downstream portions of the pressure control line 6. In operation, the device 30, termed a volume controller, is partially compressed when dispensing is not occurring. The partial compression does not prevent flow through the device and thus the prime valve 7 pictured in FIG. 32 beyond the volume controller 30 can function to allow rapid and efficient priming of the beverage fluid flow pathway. The flow control valve or volume controller 30 shown in FIG. 32, as well as in FIGS. 10 and 11, includes a pair of anvil compression cylinder assemblies 31 mounted on a cylinder support plate 32. The operation of the cylinder assemblies is controlled by the electronic controller EC, and more specifically by a solenoid operated compression cylinder control valve and regulator (not shown) operating through the cylinder air feed line 33. Bridge supports 34 carry a tubing backer plate 35, the tubing 2 being disposed between plate 35 and compression anvil 36 which is carried by the pistons of the compression cylinder assemblies 31.

Figure 12:
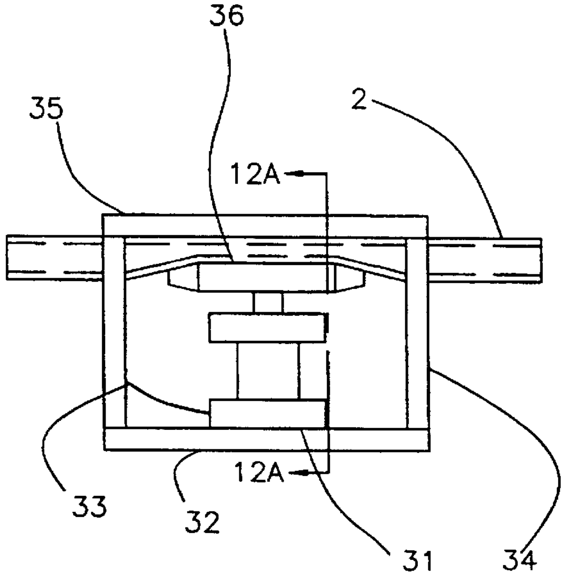
FIG. 12 is an alternate design of a flow control valve.
Figure 12A:
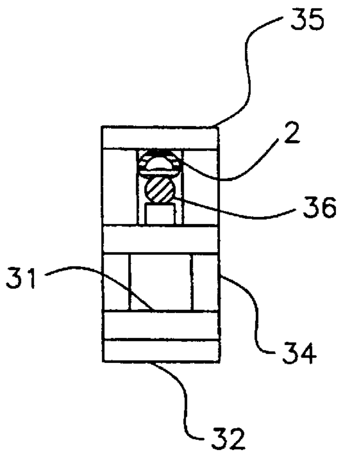
FIG. 12A is a section taken generally along the line 12A—12A in FIG. 12.

A single cylinder assembly volume controller 30 is shown in FIGS. 12 and 12A and functions in a manner similar to a pinch valve in that a compressible flow tube 2 or conduit is laterally collapsed to reduce lumen volume in the tube but not occlude flow. Alternatively, the actuator may be retracted to allow the tube to assume its full lumen volume. The motion described can be established mechanically or be defined electronically. In the example shown, the stroke of the actuator is a mechanically defined pneumatic design. However, encoding of the stroke can provide electronic control and actuation can be by any known means including by rotary motors, solenoids, linear motors or voice coils. It should also be understood that many alternate forms of the volume controller are possible including piston types, diaphragm types and bladder types.

The purpose and function of the volume controller in beverage dispensing foam management and control is straightforward. From a compressed or minimum volume position, the volume controller is shifted to its maximum volume condition at the start of a filling event after the main flow control valve has been closed. This increase in volume in the portion of the fluid flow pathway isolated by the main flow control valve from rack or system pressure causes the pressure in this portion of the system to drop. This drop in pressure allows foam control and definition in a manner akin to that previously described in conjunction with the function of the pressure control valve.

It should be noted that the prime valve associated with the volume controller remains closed during dosing events and thus there is no flow of gas or beverage to atmosphere in this method except when the prime valve is opened for system priming or re-priming after a watchdog timed prompt.

The volume controller 30 may be shifted to its minimum volume configuration at any time after beverage flow from the beverage supply has begun, and it is thus readied for the next subsequent pour. It should also be noted that it is possible to combine the functions of the volume controller and the prime valve into one integrated device, the many forms of volume controllers and integrated volume control and flow control devices being the subject of a separate disclosure.

The second principal method of foam control and definition is by control and manipulation of the actuation timing and motion relationship between the filling nozzle and the main flow control valve. This method may or may not be utilized operatively in conjunction with the first method.

This method may be termed start fill delay and consists of sensing the opening of the dose nozzle to its full open condition and then electronically varying the opening of the main flow control valve from essential no delay to a desired delay. This manipulation controls foam formation in the serving vessel by controlling flow turbulence as a function of the amount of air introduced into the drink. This foam control is possible because, from the time that the nozzle opens until system pressure mediated flow is allowed, gravimetric flow occurs from the open nozzle. Because the nozzle volume is not open to atmosphere, air enters the nozzle as the liquid beverage flows or falls out of the nozzle. The longer main flow from the beverage supply is delayed, the more air enters the filling nozzle. When the flow control valve is opened and flow from the supply ensues, the air that has entered the nozzle is largely displaced out of the nozzle and into the volume of beverage being filled into the cup. Because more air in the pour results in more turbulence and more turbulence results in more foam, it can be understood that a mechanism for defining foam quantity in the drink pour is established where no delay between nozzle opening and flow control valve opening represents minimum foam and more delay represents more foam. This method is electronically defined and controlled in the control electronics of the dispenser of the present invention and may be altered at will and may be included as a setup variable or machine operating parameter associated with each distinct beverage type or brand to be dispensed from the device.

It should be understood that while the preferred configuration of this second principal foam control method provides for the filling nozzle open condition to be sensed by a sensor encoding or marking such nozzle status, the method can be implemented on a timer basis only if desired.

The third principal method of foam control and definition is also by control and manipulation of the actuation and timing and motion between the filling nozzle and the main flow control valve, but utilizing a different motion relationship.

This method may be termed nozzle opening aperture control. It consists of sensing the opening of the filling nozzle such that the very initial motion or opening of the nozzle is detected or encoded, and then electronically varying the opening of the main flow control valve from essentially no delay relative to initial nozzle opening to a desired delay including until the filling nozzle is fully open. This manipulation controls foam formation in the serving vessel by controlling flow turbulence as a function of flow velocity at the nozzle opening, which is a function of the amount of opening of the nozzle tip and thus the square area of the nozzle flow aperture.

This foam control methodology is possible because when the nozzle begins to open the annular flow pathway around the nozzle plug 21, 22 is relatively small. Thus, if flow from the beverage supply is allowed at the first opening of the nozzle, the velocity of the flow is relatively high and decreases as the nozzle becomes progressively more fully open, dropping to some finite and minimal velocity when the nozzle becomes fully opened. It will be understood the flow velocity of the beverage into the serving vessel is directly correlated with the amount of foam formed as a function of the dose flow.

This third method of foam manipulation is electronically defined and controlled in the control electronics of the dispenser of the present invention and may be altered at will and can be included as a setup variable or machine operating parameter associated with each distinct beverage type or brand to be dispensed.

As with the second method of foam control, this method may be established on a purely timer related basis in lieu of nozzle encoding, and may or may not be used in conjunction with the first method of foam control.

The fourth principal method of foam control and definition is by control and manipulation of the motion of the filling nozzle alone, at the end of the pour or dose event.

This method may be termed filling nozzle closing aperture control. It consists of controlling and varying the rate of filling nozzle closure at the end of the filling dose event.

The design of the dispenser of the present invention provides for electronic means to determine the beverage dose as a function of time pressure flow, and it also can provide means to control the rate at which the filling nozzle closes at the end of the fill, from very fast to relatively slow. It will be understood from discussion of the first three foam defining methodologies that flow velocity into the serving vessel defines flow turbulence in the vessel and thus the amount of foam created in the vessel. It is also understood from previous discussion that the size of the annular flow area at the nozzle tip, as a function of the position of the nozzle tip relative to the nozzle barrel defines flow velocity of the beverage exiting the nozzle. Thus it is clear that if the nozzle is slowly closed, the flow velocity will slowly increase, thus increasing turbulence and thus increasing foam. Conversely, if the nozzle is closed quickly, the duration of the flow velocity increase as a function of nozzle closing is minimized and thus foam is minimized as a function of nozzle closure.

Control of nozzle closure rate can range from manual to fully electronically controlled and is achieved by most known conventional methods including pneumatic, variable hydraulic shock absorber, linear motor control, and all methods of rotary motor control.

As with discussion concerning previous foam control methods, the electronic control of nozzle closure, use with the first method, recipe or parameter based setup of the dispenser and encoded and timer based control are all possible with the fourth method of foam control.

It should also be noted in regard to the fourth method that the best dose accuracy or repeatability of the dispenser is achieved when the filling nozzle is closed quickly.

The fifth method of beverage foam control and manipulation is by control of the nozzle opening distance or dimension throughout the pour period. The dispenser of the present invention is designed to operate with both inward and outward opening positive shut-off filling nozzles as illustrated in FIG. 3 and FIG. 30 respectively.

An examination of the outward opening type of FIG. 3 will show that the opening dimension of the nozzle plug can be defined by limiting or controlling the nozzle stroke. This is done by mechanical or electronic means and either can be manual or automatic. The mechanical limit of stroke is achieved by interposing a stop (not shown) between the nozzle operator rod anchor block 26 at the very top of the nozzle and the upper shoulder 16.1 of the actuator, an air cylinder in the case of the illustration. This stop can be a simple spacer fitted over the actuator operator rod 39, or it can be an adjustable stop on a screw actuator, or a cam operated stop, or many other variants. Except for the spacer, the various means can be controlled by the control electronics using linear or rotary motors or solenoids or voice coils, or any other suitable actuator. Furthermore, the primary actuator of the nozzle can be controlled directly to define the nozzle stroke or opening dimension, actuator means including those already described.

Figure 28:
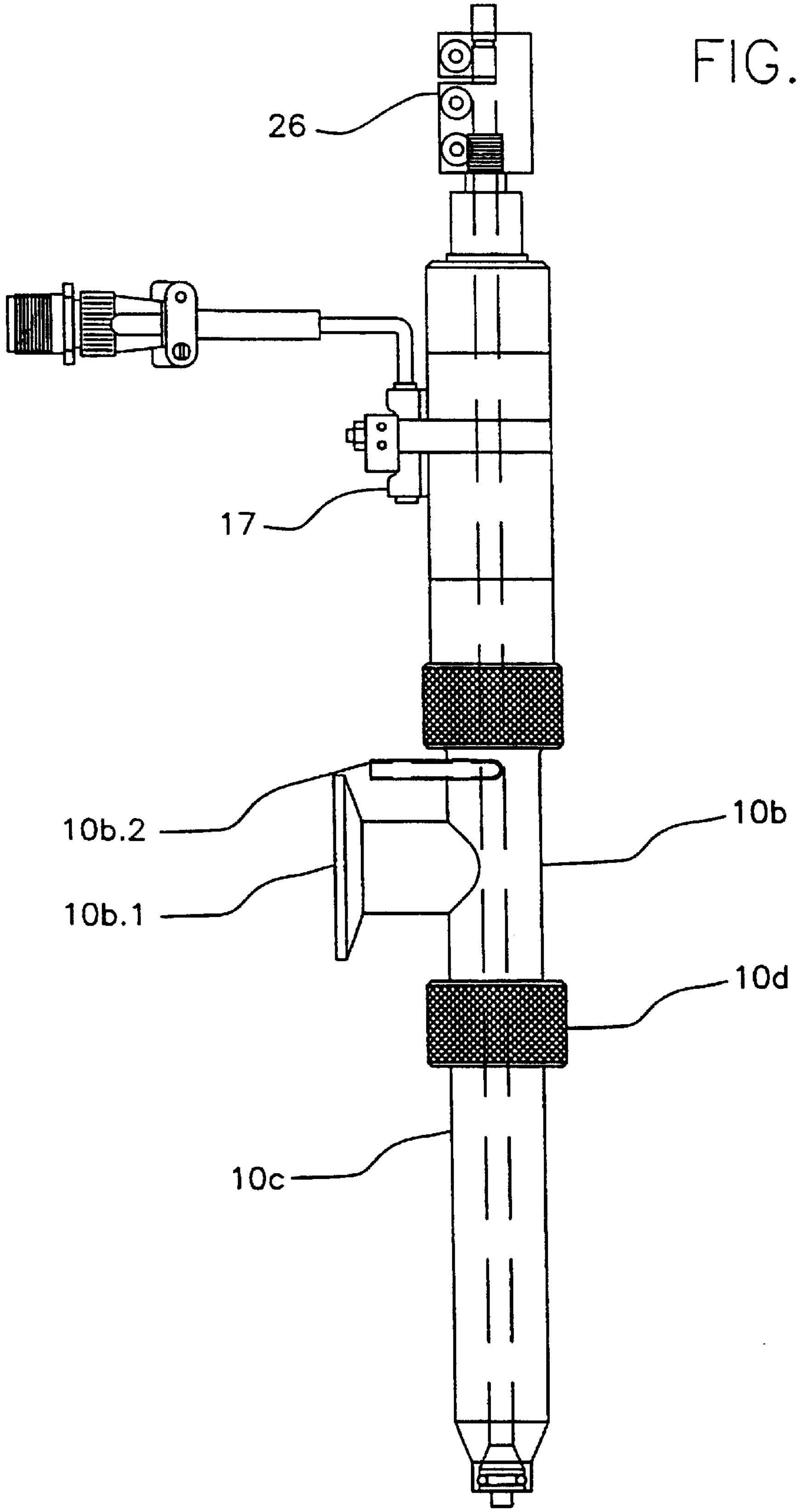
FIGS. 28–30 show an inward opening beverage filling nozzle, FIG. 28 showing the nozzle in a closed position, FIG. 29 showing it in an open position, and FIG. 30 being an exploded view.
Figure 29:
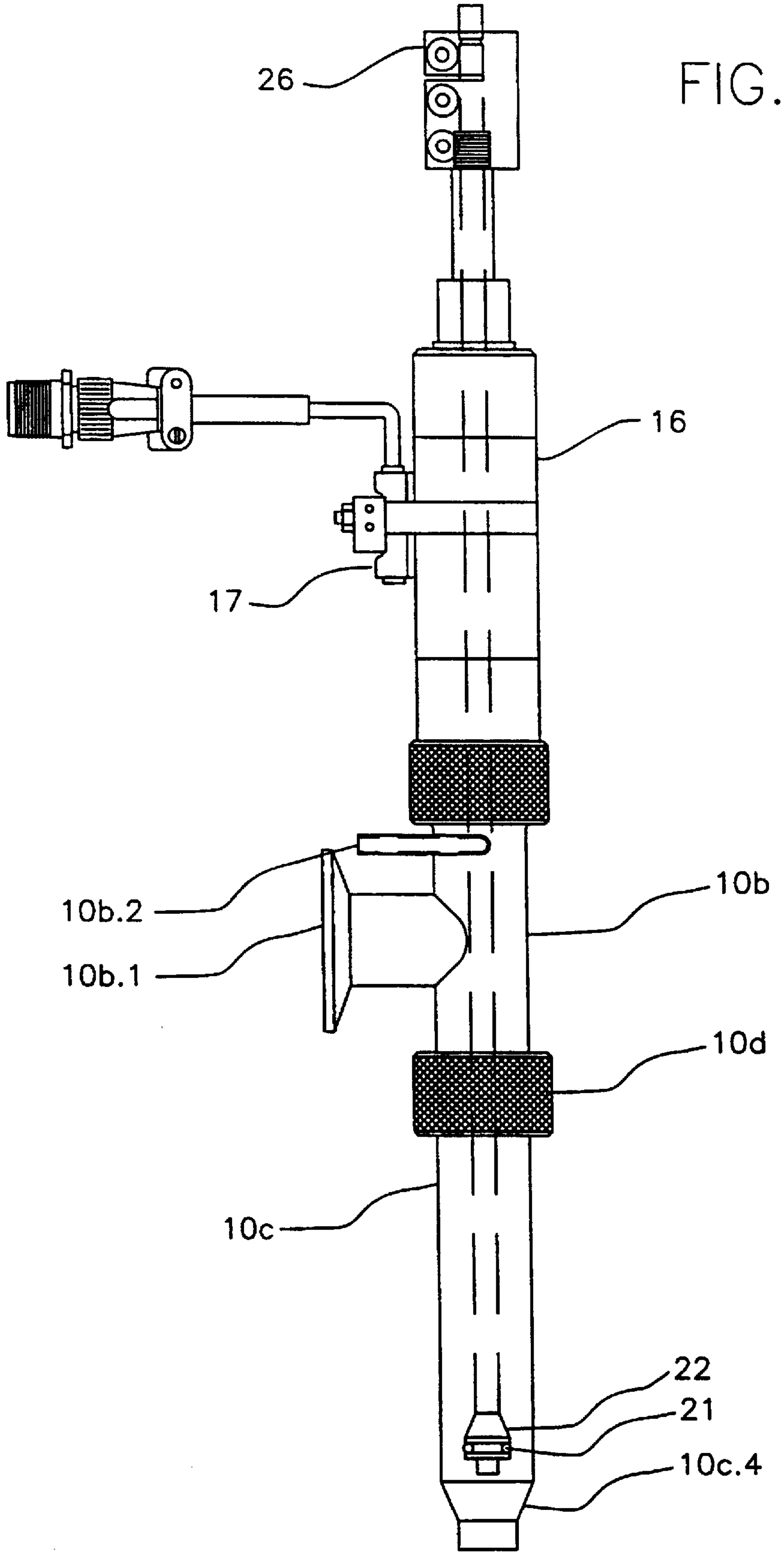
Figure 30:
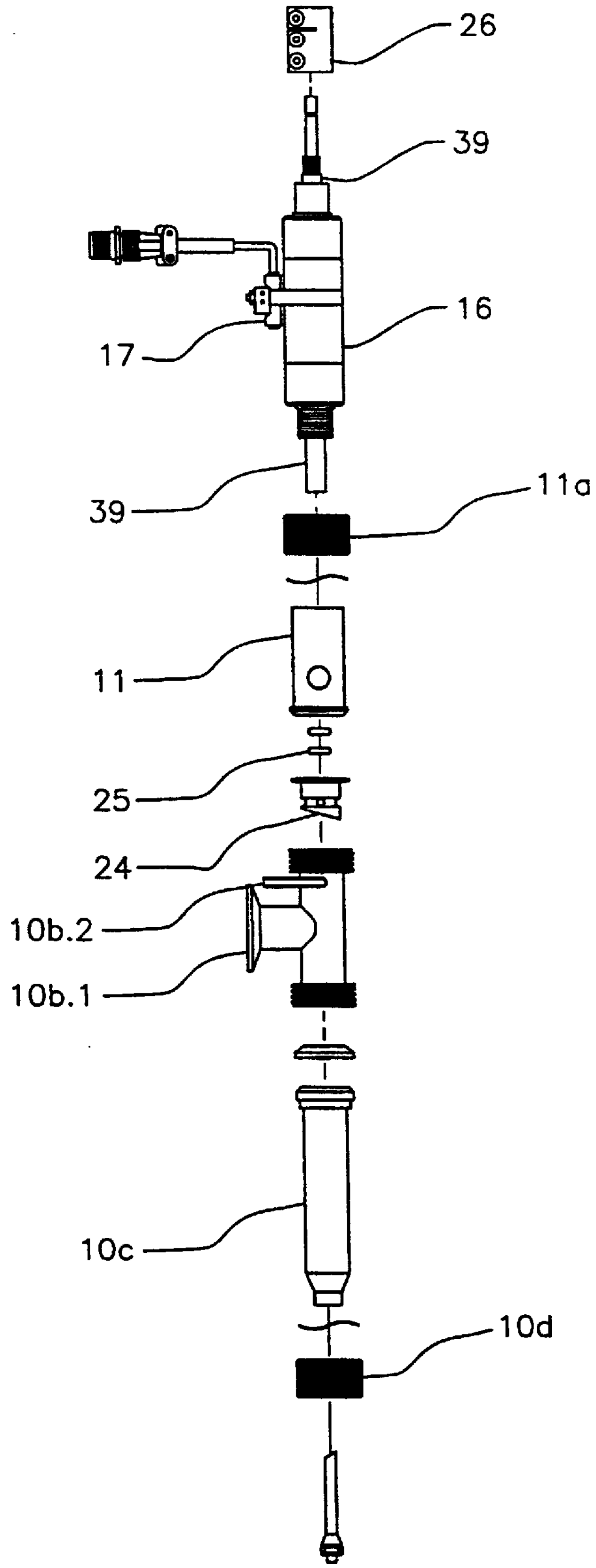

One embodiment of an inward opening beverage filling nozzle is shown in FIGS. 28–30. Initially, it can be seen that this design has a differing diameter and length from the filling nozzle shown in FIG. 1. The flow orifice can be defined by the amount of opening of the nozzle plug as it is moved up into the nozzle lumen, compare FIGS. 28 and 29. The nozzle fill tube is made of upper and lower parts **10*b* and 10*c*, respectively, which are coupled together by a threaded knurled coupler 10*d*. The lower portion 10*c* has a frusto-conical inwardly extending tapered lower end 10*c*.4 which is sealed by a nozzle plug 21, 22 similar in design to the nozzle plug 21–22 best shown in FIG. 5. In this design the nozzle bridge 11 is connected to the upper portion of the nozzle 10***b* by another knurled coupler 11*a*, rather than by a tri-clamp fitting. The bottom taper angle 10*c*.4 formed by the lower portion of the nozzle, along with the nozzle plug, defines an increasing flow aperture as the plug travels further up into the nozzle tube until it is fully into the parallel wall section of the nozzle tube as shown in FIG. 29. The control of the nozzle stroke in the case of the inward opening filling nozzle is essentially the reverse of the outward version and by the same methods and apparatus. In both cases, the opening dimension can represent a setup parameter in the dispenser control electronics and can be grouped along with other essential system settings for any particular beverage.

As has already been disclosed in the portions of this specification discussing foam control, smaller nozzle flow orifices cause higher flow velocities into the serving vessel and higher flow velocities create more foam, other parameters being comparatively equal. Thus by defining a nozzle opening geometry throughout the pour, the total amount of foam created can be influenced or defined or controlled. This fifth foam control methodology can be utilized in combination with the other methods.

The sixth principal method of foam control and definition is by electronic control and manipulation of the system or rack pressure at which the dispenser operates.

It is readily apparent that varying the pressure applied to the beverage in the dispenser herein disclosed will alter the flow rate of beverage through the dispenser fluid flow pathway and into the serving vessel and thus influence the amount of foam created in the vessel. It is also clear that under a given set of conditions of dispenser geometry and operating parameters there is an optimum flow rate for pouring a carbonated or sparkling beverage into a vessel as rapidly as possible while creating a desired amount of foam associated with the beverage serving.

Manual adjustment of the pressure applied to a beverage, such as beer, is well known through conventional means such as the use of a mechanical gas pressure regulator. However, these means are cumbersome and often inconvenient to implement. The novel means of control of beverage pressure and thus flow rate and thus foam in the present invention is by use of a digital pressure controller.

Figure 16:
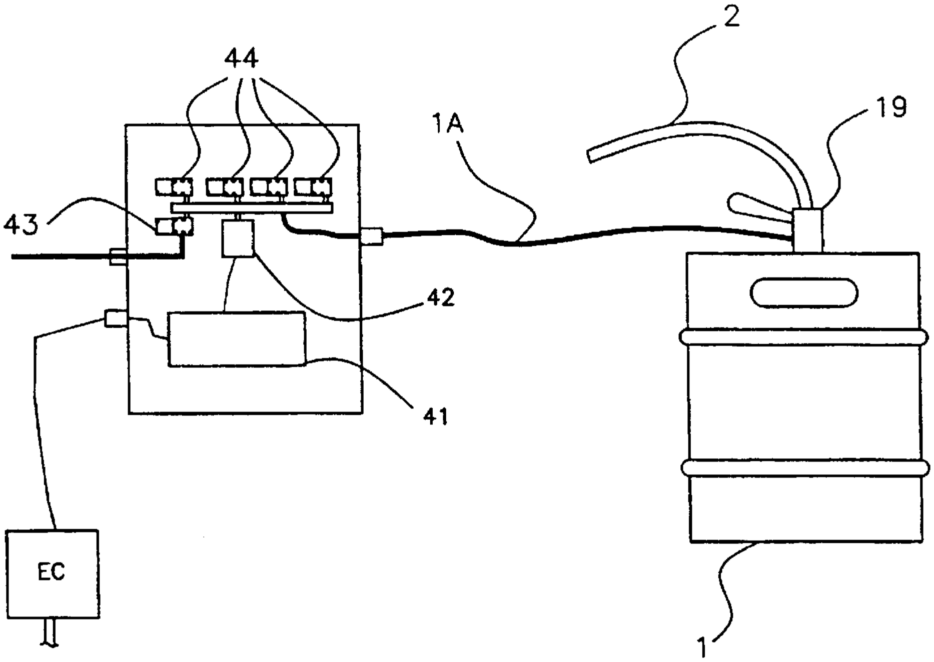
FIG. 16 is a partial illustration of the dispensing system of this invention wherein a digital pressure control unit is associated with the source of gas to control the pressure within the keg.

A digital pressure controller, indicated generally at 40 in FIG. 16, provides for electronic sensing and control of pressure in an enclosed or defined volume or containment. Such a device is pictured schematically in FIG. 16, and is manufactured by Oden Corporation of Buffalo, N.Y., USA.

In operation with a beverage dispenser such as herein disclosed, a microcontroller 41 and a pressure sensor 42 function to control the gas pressure, typically carbon dioxide, applied to a keg of beer 1 or other bulk beverage source. The digital term in the device name refers to the means and mode of pressure control. When pressure is sensed to be too low, a fast-acting inlet solenoid valve 43 opens to admit gas at relatively high pressure. This quickly increases pressure in the pressure controlled enclosure, and the valve turns off when the desired set point is reached. Likewise, when pressure is sensed by the pressure sensor to be too high, an array of fast-acting exhaust solenoid valves 44 open to exhaust gas from the pressure controlled enclosure to atmosphere. Thus it can be seen that the control action in either case is on-off or digital. This form of control is responsive in less than ten milliseconds and is highly precise. Because gas is compressible, the digital addition or removal of gas is readily integrated and thus the set point varies in a relatively smooth analog manner.

This use of digital pressure control in beverage dispensers is novel and allows direct electronic control of primary flow rate in the system with direct access via the electronic control of the dispenser and with beverage rack pressure selectable as a grouped parameter for machine setup. The pressure control apparatus can be a discrete device or be incorporated into the controls for the dispenser pictured in FIG. 6.

The use of an active electronic pressure control device also allows another novel control aspect of dispenser operation. Because dose time varies as a function of rack pressure, it is possible to construct a control formula which allows a particular dose time to be achieved by defining a particular rack pressure. This allows further automation of dispenser setup.

A still more sophisticated aspect of the sixth principal method of foam control involves the use of flow profiling by varying the applied rack pressure during a dispensing interval or period.

It will be understood that it is possible to generate a minimum amount of foam into a serving of a carbonated beverage by using a slow or low flow rate to introduce the beverage into the serving vessel. In fact, this is the essence of most beer pouring methodologies of conventional or known nature. The consequence is a very slow dispense time. However, with digital pressure control, it is possible to begin the pour at a low rack pressure and thus a low flow rate until the nozzle orifice is subsurface or below the level of the beer in the vessel, then rapidly and smoothly increase the rack pressure and thus the beverage flow rate for the largest part of the pour, then rapidly and smoothly decrease the rack pressure and hence the beverage flow rate at the end of the pour. The result of this novel beverage dispensing technique is excellent foam control and a net reduction of the total pour time. This methodology can also be integrated into the set of electronically grouped and defined system operating parameters for a particular beverage.

The seventh principal method of foam control and definition is by mechanical or electromechanical control and manipulation of the beverage dispense flow rate by restriction or unrestriction of a novel flow control in the beverage fluid flow pathway.

Figure 10:
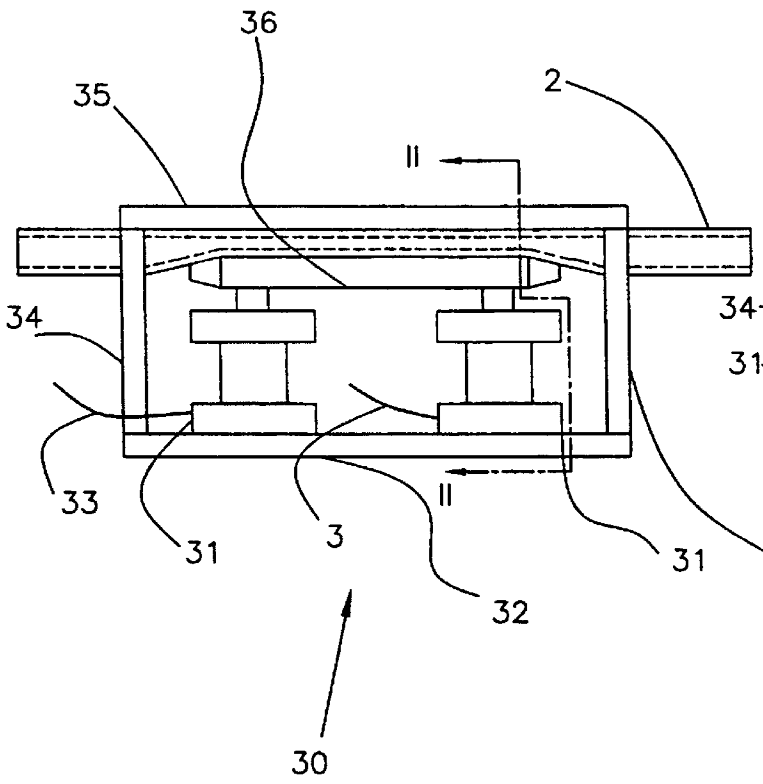
FIG. 10 is an enlarged view of one version of the flow control valve shown in FIG. 9.
Figure 11:
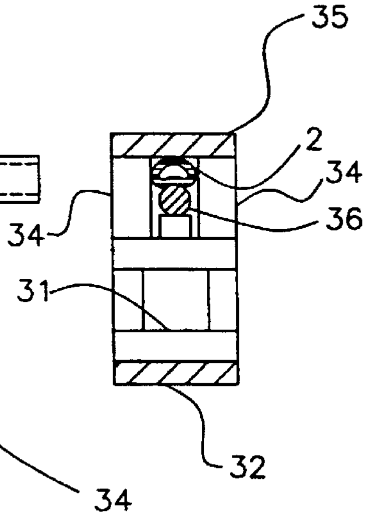
FIG. 11 is a section taken generally along the line 11—11 in FIG. 10.
Figure 13:
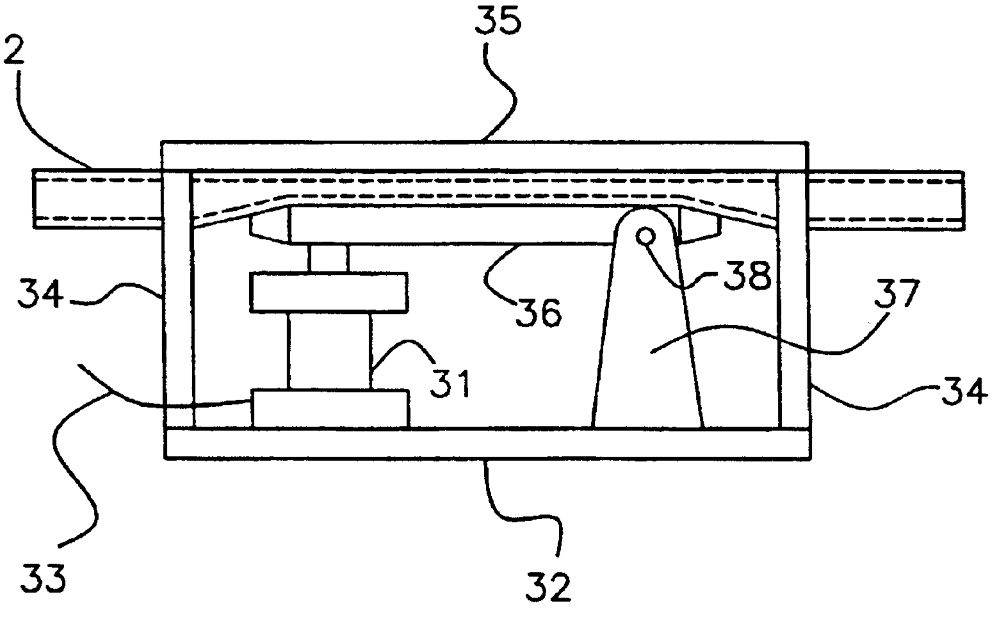
FIG. 13 is a further alternative design of a flow control valve.
Figure 14:
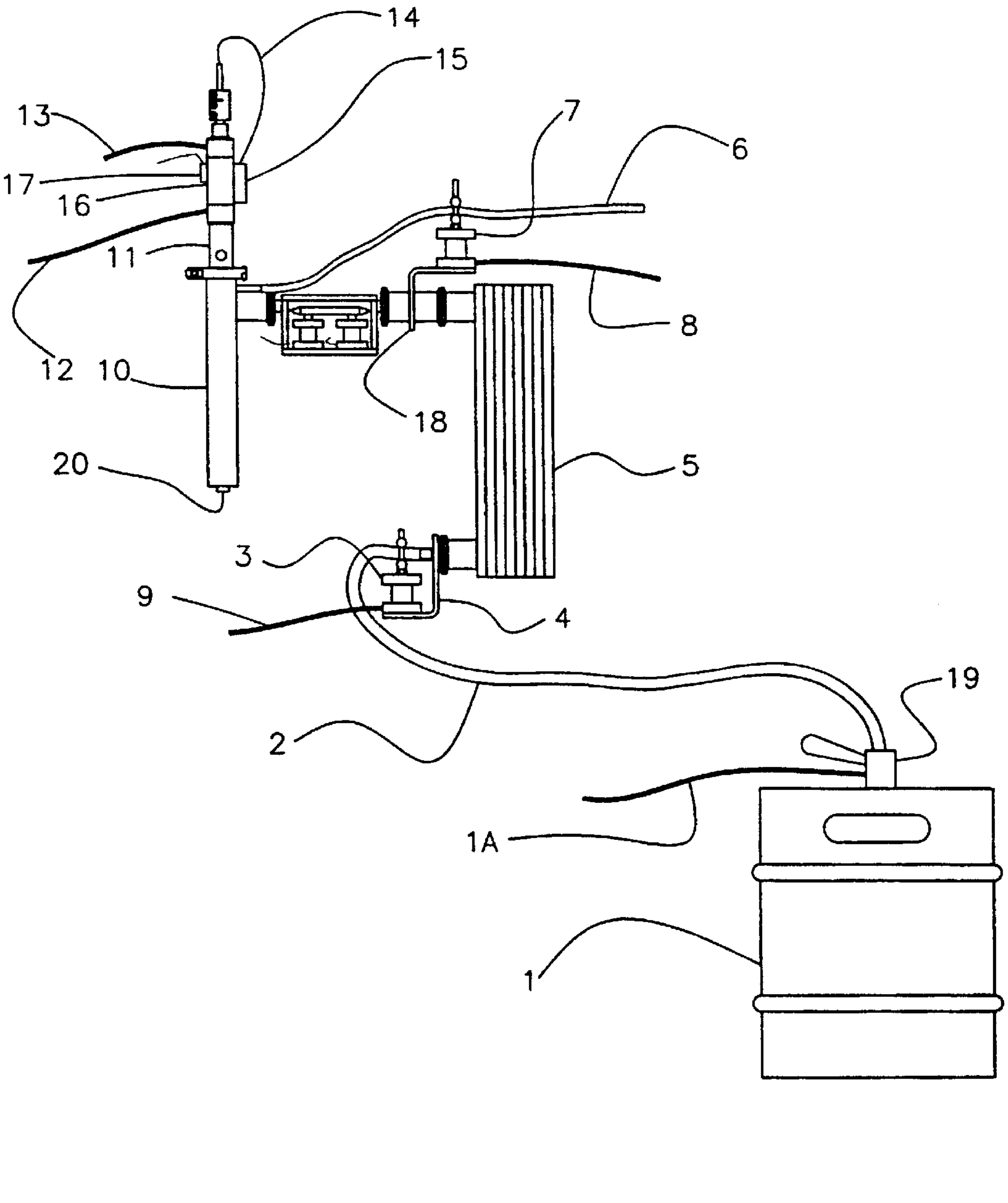
FIG. 14 is a view similar to FIG. 9 but showing the volume controller or flow control valve located between the heat exchanger and the filling nozzle assembly.

FIGS. 10, 12, and 13 illustrate novel flow control devices particularly appropriate to the flow rate control of carbonated beverages. These devices are the subject of a separate disclosure and will thus be only generally described herein. FIG. 13 differs from FIGS. 10 and 12 in that the compression anvil is pivotally supported at one end by a mounting bracket 37 and pivot pin 38.

It is understood that rapid restrictions in a carbonated beverage flow line can cause dissolved gases to leave solution and cause bubbles and foaming in the flow line downstream of the restriction. The devices generally shown in FIGS. 10 and 13 overcome this problem by providing a gradually restricting profile and a long axis of restriction. This allows substantial flow rate control without in-line foaming. The devices also have the novel advantage of being non-invasive to the flow line and thus exceptionally sanitary in character.

The ability of these long axis flow rate controls to operate in carbonated beverage lines provides a means of flow rate control akin to the digital pressure control device in method six. Flow is altered as a function of restriction rather than alteration of motive force, but the result is equivalent. Further, the long axis flow control device can be modulated during a fill to provide flow rate profiling as in method six.

The eighth principal method of foam control and definition uses an applied gas pressure above the rack pressure to inhibit gas and bubble formation in the filling nozzle and thus prevent or inhibit foaming when beverage flow under rack pressure into the serving cup or glass.

Figure 31:
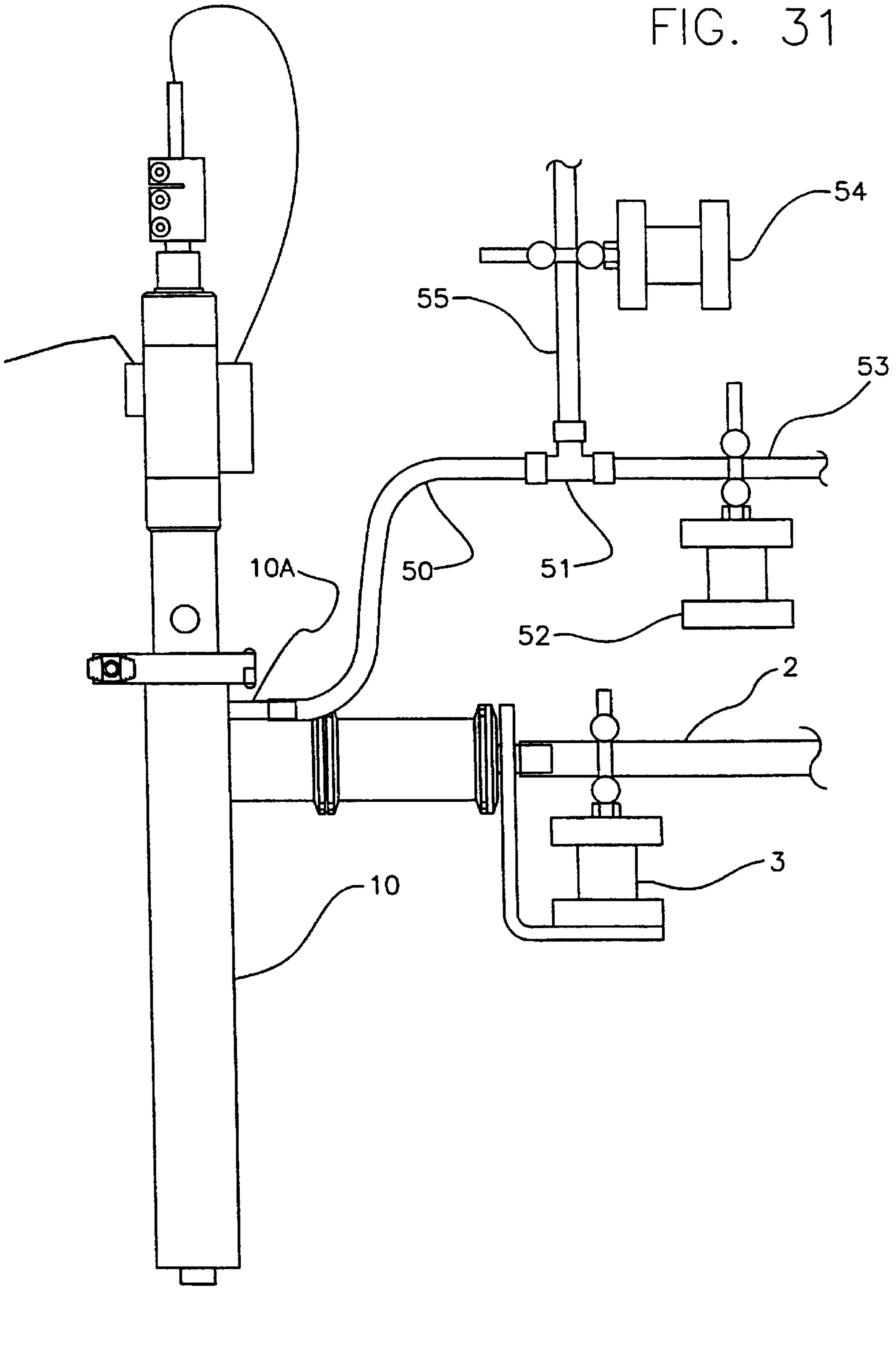
FIG. 31 disclosed an apparatus wherein gas pressure above the rack pressure is employed to inhibit gas and bubble formation in the filling nozzle and thus prevent or inhibit foaming when beverage flow under rack pressure into the serving cup or glass.

The apparatus specific to this method is shown in FIG. 31. It consists of a filling nozzle 10 of described type with the pressure control port 10.1 connected by a fluid tight conduit 50 to a tee connector 51 which branches to two pinch valves. The pinch valve 52 on the horizontal branch 53 serves the priming and pressure control functions previously and extensively discussed in the specification. The pinch valve 54 on the vertical branch 55 of the tee connects to a source of pressurized gas at a pressure substantially above the rack pressure applied to the bulk beverage source. This second valve 54 is called the high pressure valve or alternatively the pressure boost valve.

It will be understood that the higher the pressure applied to a carbonated beverage, the more difficult it is for dissolved gas in the liquid to come out of solution and into gas phase. The physics of such systems is well understood and will not be recapitulated here. Because higher pressure inhibits outgassing, the eighth method of foam control is designed to prevent foam or gas bubbles from forming in the filling nozzle and associated structure and thus reduce foaming in the vessel during beverage dispensing. This method requires that at the end of a pour, after the filling nozzle closes, the main flow control valve 3 is closed, isolating that portion of the fluid flow pathway on the nozzle side of the flow control valve from the rest of the system. With the main flow control valve closed, the high pressure valve 54 can be opened, applying the above rack pressure to the isolated portion of the pathway and thus inhibiting outgassing when the dispenser system is not dispensing a drink. When a dispensing cycle is initiated, the pressure boost valve 54 is closed and the pressure control valve 52 is actuated as previously detailed. The main flow control valve is already closed in this method, and after nozzle opening occurs, it opens in the usual manner to allow rack pressure defined beverage flow into the serving vessel. As with the other methods described, the high pressure valve can be electronically defined in function by the dispenser control electronics.

Figure 17:
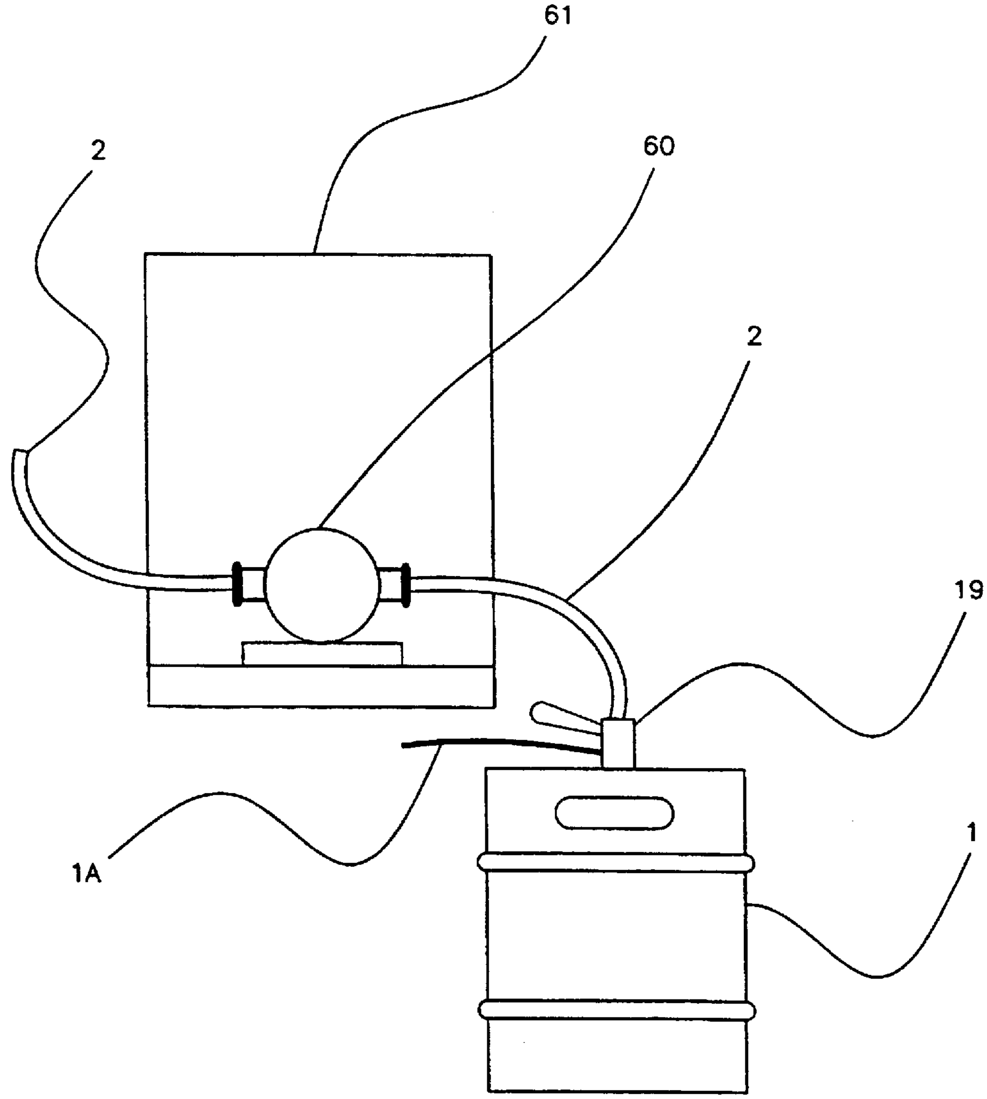
FIG. 17 is a partial illustration of a system wherein the flow rate is controlled by a positive displacement pump which is located between the beer keg and the main flow control valve.

Another object of the present invention is to utilize a rotary positive displacement pump 60 of suitable sanitary type to displace carbonated beverage to and through the dispensing apparatus, which pump is driven by a suitable pump drive 61. FIG. 17 somewhat schematically depicts such a system. It is a common problem in carbonated beverage installations that the bulk supply of beverage can be quite remote from the dispenser apparatus. As this separating distance increases, the available flow rate of beverage to the dispenser is reduced and limited by the flow resistance offered by the longer runs of beverage flow lines. One means to overcome this problem is to increase the gas pressure at the keg or bulk source so that more force is operating on the beverage. However, higher gas pressures over the large square area of the bulk beverage container can drive excess gas into solution in the beverage and thus alter its quality or character. With this limitation in mind, it is uniquely possible with the present system to utilize a rotary positive displacement pump 60 to increase beverage flow rate. This is because the pump can operate in an already pressurized and hydraulic system, allowing pumping action to take place without foaming or outgassing as a consequence. This is true because the pump can be placed near the supply, minimizing suction pressure, with increased pressure occurring on the balance of the fluid flow pathway downstream of the pump discharge. Thus, this limitation of the differential pressure across the pump is the key to its ability to increase beverage flow without foaming. In the present dispenser invention, the pump can be integrated into the beverage electronic controls such that it operates only when the dispenser is demanding flow. This avoids deadhead or no discharge pumping and the foaming it would produce. Further, the pump can uniquely auto tune such that it steadily increases flow until it achieves a specified dose time at the dispenser filling nozzle. As an alternative, it is also uniquely possible to encode or otherwise measure the rotation of the pump and thus use pump displacement to define the beverage dose at the dispenser.

It will be understood that there is a limit to the differential pressure across the pump before foaming or outgassing of the beverage occurs. This pressure can be limited and controlled in this design by direct sensing of the differential pressure using pressure sensors, or the pump can be RPM limited to limit pressure differential.

It will be understood by those knowledgeable in carbonated beverage dispensing that the best way to dispense such beverages, and especially beer, in the most rapid way and with the best control of foam, is often to place the filling nozzle beneath the level of the beer In the serving container. This "bottom-up" filling technique is widely known and practiced in beverage dispensing as well as in the filling of many other foamy liquids, and this method of manually manipulating the beverage filling nozzle relative to the beverage and container is fully contemplated for use with the present invention.

Figure 15:
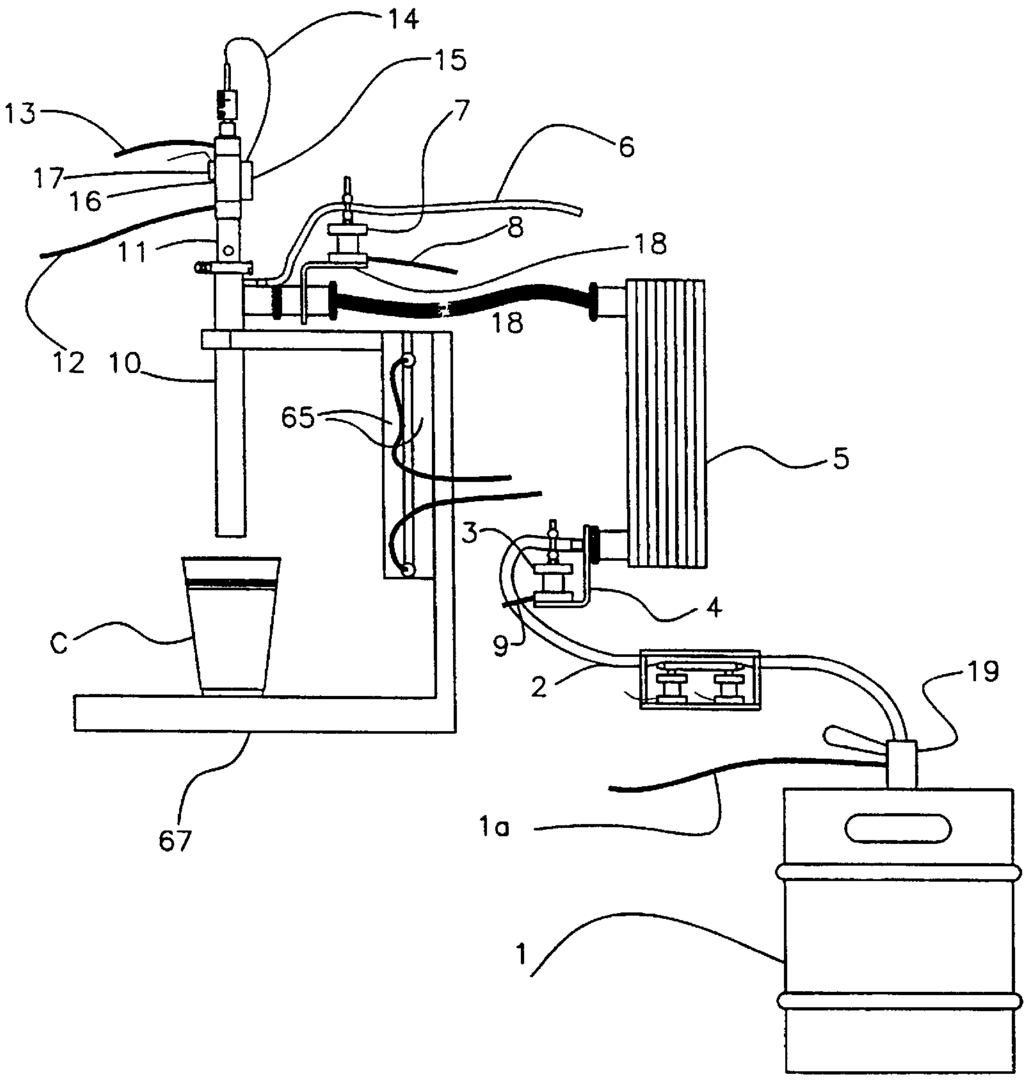
FIG. 15 is a view similar to FIG. 9 but showing the filling nozzle assembly and pressure control valve mounted upon a support which is moveable vertically so that the nozzle can be moved down into a beverage cup and upwardly out of the beverage cup as it is filled.

FIG. 15 illustrates a novel aspect of the present invention and illustrates automated nozzle filling motion and manipulation relative to a serving cup C. This method allows the filling nozzle 10 to automatically be lowered into a serving cup C until it is near the bottom of the cup, and to be gradually and progressively raised up out of the cup on an automatic basis such that the bottom of the nozzle is held and remains below the rising level of the beverage flowing into the cup, but not such that the displacement of the nozzle in the dispensed beverage causes the beverage to overflow the cup. This automatic nozzle motion can be effected pneumatically, servo-pneumatically, or using known rotary and linear motor drive and control methods, the nozzle raising and lowering mechanism being shown at 65. It is unique in beverage dispensers, and is beneficial in removing the manual filling skill or technique otherwise required to fully exploit the high speed dispensing capability of the invention. The dispenser control electronics can provide this described nozzle motion control, which can be self-teaching in terms of motion rates and distances and can be a stored machine setup and operating parameter associated with a particular beverage type and container type or size.

The filling nozzles of the beverage dispenser of the present invention are particularly designed and intended to operate below the surface of the beverage being dispensed into a container. Thus, the outside surfaces of the nozzle are wetted repeatedly by the beverage being dispensed. Most beverages support some bacterial growth and over time a filling nozzle wetted by a beverage can become contaminated as a result of such growth. Thus, the nozzle of the present invention should be cleaned and sanitized from time to time.

Figure 27:
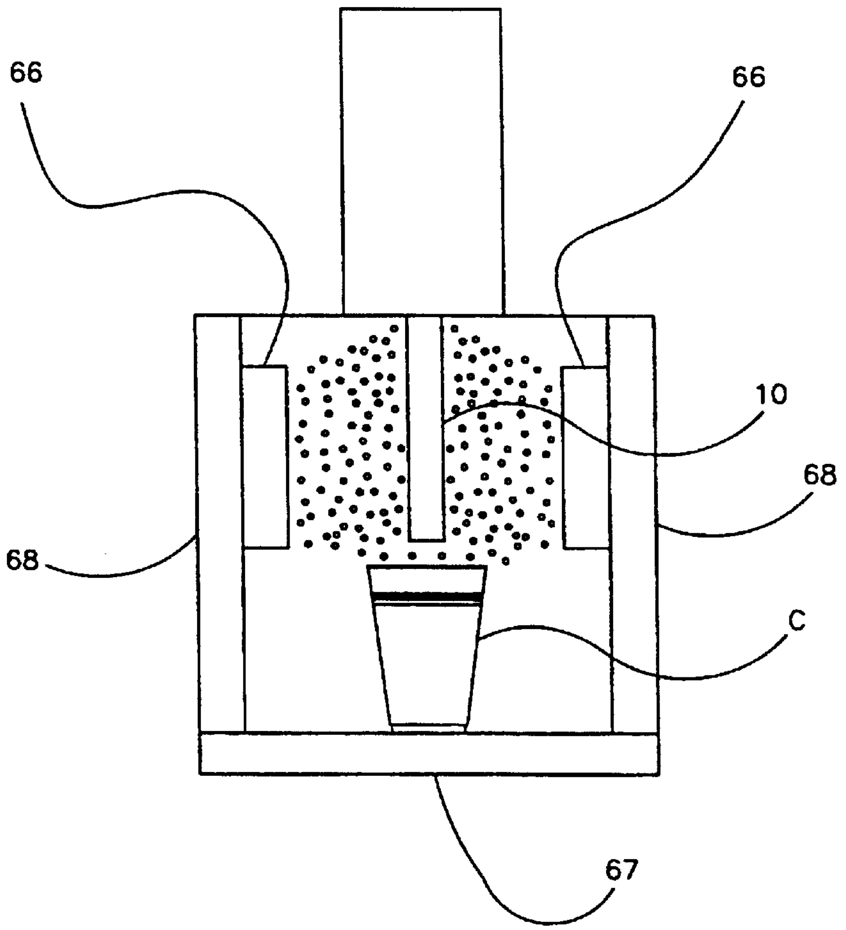
FIG. 27 shows apparatus for retarding the rate of growth of bacteria on the external surface of the nozzle tube in the form of an ozone generator.

One novel means of maintaining a filling nozzle of the type disclosed in this specification in a sanitary condition, is through the use of one or more ozone generators 66 in relatively close proximity to the nozzle, as shown in FIG. 27. Ozone is a potent bactericide and can reduce and maintain a low bacterial count on nozzle surfaces. With further reference to FIG. 27, the cup C is supported by a support 67, and the ozone generators on supports 68. While the supports 67 and 68 are stationary, they may be moved and the nozzle may be stationary.

It is a particular object and novel feature of the invention that the fluid flow pathway of the dispenser is particularly designed to minimize or eliminate beverage foaming or outgassing as a function of flow through the system. This is achieved in numerous ways including the use of large flow aperture straight through flow design valves, and through the use of features internal to the filling nozzles, both as detailed elsewhere in the specification. In addition, the fluid flow pathway is generally uniform in flow diameter throughout or, where transitions occur, the diameter increases with the transition. Also, wherever possible, smooth, low turbulence connections are made as with, by example, the use of tri-clamp sanitary fluid connectors and fittings. Further, the internal finish of the fluid flow pathway is attended to with a number 3 or better dairy finish helping to further reduce flow turbulence and hence foaming.

It is a particular object and novel feature of the invention that the fluid flow pathway of the dispenser is particularly designed to minimize or eliminate beverage foaming or outgassing as a function of flow through the system. This is achieved in numerous ways including the use of large flow aperture straight through flow design valves, and through the use of features internal to the filling nozzles, both as detailed elsewhere in this specification. In addition, the fluid flow pathway is generally uniform in flow diameter throughout or, where transitions occur, the diameter increases with the transition. Also, wherever possible, smooth, low turbulence connections are made as with, by example, the use of tri-clamp sanitary fluid connectors and fittings. Further, the internal finish of the fluid flow pathway is attended to with a number 3 or better dairy finish helping to further reduce flow turbulence and hence foaming.

It is a particular object and novel feature of the present invention to provide for unique electronically programmed and controlled clean-in-place (CIP) procedures and routines for cleaning and sanitizing the high speed beverage dispenser. It is evident that cleanability of a beverage dispenser is essentially as important as the dispensing performance of the device. Hence, the dispenser herein disclosed is provided with many unique and novel features and apparatus for enhancing the ease and completeness of system cleaning and sanitizing.

Overall, the dispenser is cleaned by following accepted practice which is to wash, then rinse, then sanitize, then optionally re-rinse the fluid flow pathway.

Referring to FIGS. 1 and 8, to clean the dispenser the beverage supply is first uncoupled from the system. In its place, a pressurized source of soapy wash water may be connected. More commonly, a five gallon plastic pail of soapy wash water may be used with the beverage coupler connected into a suitable CIP pump for moving the wash water through the dispenser system. The pump may be of many types including centrifugal, rotary positive displacement, rotary peristaltic, air operated diaphragm or linear peristaltic.

The linear peristaltic pump of the gas driven type is particularly suited due to its high pressure capability, low cost and ease of on-off control. An example of such a pump is that manufactured by Niagara Pump Corporation of Buffalo, N.Y., USA.

After a flowable source of wash water is available, the CIP pump is connected to the beverage dispenser control electronics and the CIP routine is initiated via the display and keypad as shown in FIG. 6. Many cleaning routines or sequences can be provided via software for the CIP process. The routine herein described is typical and generally preferred.

The cleaning sequence begins with the CIP pump being turned on and allowed to run until the system is pressurized, typically to 20 to 25 PSI. This pressure can be readily defined by specifying the operating gas pressure of the pump. After the system is pressurized, the main flow control valve (MFCV) and the pressure control valve (PCV) are opened for three seconds, then closed. This subsequence is repeated twice to assure the system fluid flow pathway is primed with the cleaning solution. The CIP pump operates on a demand basis to maintain flow and pressure. All system valves are then closed for one second.

After priming with cleaning solution, the MFCV and filling nozzle are both opened and closed simultaneously for one second. After a one second cycle interval, the MFCV and the PCV are opened and closed simultaneously for a one second duration. After a one second cycle interval, this sequence is automatically repeated until five repetitions have been completed. The number of repetitions and the flow durations are adjustable via the electronic controls.

After the initial cleaning sequence, a three to five minute soak cycle is initiated. Time-out and CIP sequence status of this and each stage of cleaning are shown in the control interface display.

After the cleaner solution soak cycle, the MFCV is opened. After the MFCV is open, thus pressurizing the system, the filling nozzle is opened and closed at approximately 2 to 5 Hz., thus creating a “chatter” effect during which highly pulsating cleaner is pulse flowed through the fluid flow pathway of the dispenser and out the filling nozzle at relatively high discharge velocities. The result of this part of the sequence is a relatively vigorous “washing machine” like action causing a scrubbing action in the fluid flow pathway.

After the described wash sequence is completed, the beverage source connector line is removed and a pump out sequence lasting for approximately thirty seconds is initiated via the keypad control surface of the dispenser electronic controls. During the pump out, all system valves are opened assuring complete pathway draining. The described wash sequence consumes approximately two to five gallons of wash solution dependent upon flows and pressures. The effluent from the filling nozzle and the pressure control line are typically collected in another five gallon bucket.

After the wash cycle is completed, a similar or identical procedure and sequence is carried out using clean rinse water, typically at elevated temperature.

After the rinse cycle is completed, a sanitizer, typically of the caustic or chlorine type, is cycled through the system in a similar or identical sequence as previously detailed.

After the system is sanitized, which is to reduce bacterial count to a very low level, the dispenser fluid flow pathway may be reconnected to a beverage supply, the beverage moved through the system as a function of priming or packing the pathway serving as a rinse out of the sanitizer. Alternatively, a water rinse akin to the first can be carried out followed by re-packing of the system with the beverage to be dispensed.

It is important to understand that the responsive nature of the fluid flow pathway valving and the sanitary design of all fluid bearing components particularly provides for a highly refined and efficient cleaning capability in the present invention which is enhanced by the programmable nature of the dispenser electronic controller which allows easy optimization and enhancement of cleaning sequences.

While the best modes of this invention known to applicant at this time have been shown in the accompanying drawings and described in the accompanying text, it should be understood that applicant does not intend to be limited to the particular details illustrated in the accompanying drawings and described above. Thus, it is the desire of the inventor of the present invention that it be clearly understood that the embodiments of the invention, while preferred, can be readily changed and altered by one skilled in the art and that these embodiments are not to be limiting or constraining on the form or benefits of the invention.

What is claimed is:

1. Method for high speed beverage dispensing into a vessel comprising the following steps:

producing a defined dose of beverage by first closing the main flow valve, then briefly opening the pressure control valve, thereby lowering the pressure in the nozzle to a desired pressure lower than that applied to the beverage supply, then gently opening the beverage filling nozzle and immediately thereafter opening the main flow valve, maintaining the main flow valve in an open condition for a time required to produce a defined dose of beverage, and then rapidly closing the beverage filling nozzle while maintaining the main flow control valve in an open condition.

2. Method according to claim 1, further comprising:

repeating the foregoing steps to produce additional defined doses of beverage as desired.

3. Method according to claim 1 or 2, further comprising:

providing a bulk supply container of the beverage to be dispensed, a main flow valve, a positive shut-off beverage filling nozzle, a pressure control valve, and tubing interconnecting the container with the filling nozzle, the container having a discharge opening, and means to move beverage through the discharge opening, the pressure control valve being interconnected with the filling nozzle downstream of the main flow control valve.

4. The method according to claim 3, further characterized by the additional step of priming the system to establish a hydraulic condition in the fluid flow pathway between the discharge opening and the bottom of the filling nozzle by charging said pathway with beverage by opening the pressure control valve and the main flow valve and thereafter closing the pressure control valve.

5. The method according to claim 1 or 2, further characterized by the additional step of priming the system to establish a hydraulic condition in the fluid flow pathway between the discharge opening and the bottom of the filling nozzle by charging said pathway with beverage by opening the pressure control valve and the main flow valve and thereafter closing the pressure control value.

6. Apparatus for high speed beverage dispensing from a bulk supply container of beverage to be dispensed, the container having a discharge opening and means to move beverage through the discharge opening; the apparatus including:

a positive shut-off beverage filling nozzle;

tubing interconnecting the discharge opening of the container with the filling nozzle;

a main flow valve; and a pressure control valve, the pressure control valve being interconnected with the filling nozzle downstream of the main flow control valve.

7. The apparatus as set forth in claim 6 wherein the positive shut-off beverage filling nozzle is a positive bottom shut-off beverage filling nozzle.

* * * * *